(12) United States Patent
Hayata et al.

(10) Patent No.: US 12,516,246 B2
(45) Date of Patent: Jan. 6, 2026

(54) DECORATIVE FILM, DECORATIVE MOLDED ARTICLE, DECORATIVE PANEL, AND ELECTRONIC DEVICE

(71) Applicant: FUJIFILM CORPORATION, Tokyo (JP)

(72) Inventors: Yuichi Hayata, Kanagawa (JP); Yuka Matsumoto, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 376 days.

(21) Appl. No.: 18/177,773

(22) Filed: Mar. 3, 2023

(65) Prior Publication Data

US 2023/0203377 A1 Jun. 29, 2023

Related U.S. Application Data

(63) Continuation of application No. PCT/JP2021/034417, filed on Sep. 17, 2021.

(30) Foreign Application Priority Data

Sep. 17, 2020 (JP) ................................ 2020-156576

(51) Int. Cl.
*C09K 19/38* (2006.01)

(52) U.S. Cl.
CPC ...... *C09K 19/3838* (2013.01); *C09K 2219/03* (2013.01)

(58) Field of Classification Search
None
See application file for complete search history.

(56) References Cited

U.S. PATENT DOCUMENTS

| | | | |
|---|---|---|---|
| 2016/0214285 A1 | 7/2016 | Taguchi et al. | |
| 2019/0302327 A1* | 10/2019 | Murata | G02B 5/0257 |
| 2020/0033522 A1 | 1/2020 | Takasago et al. | |
| 2021/0269563 A1 | 9/2021 | Hayata et al. | |

FOREIGN PATENT DOCUMENTS

| | | | | |
|---|---|---|---|---|
| CN | 109613637 A | * | 4/2019 | ............... G02B 1/10 |
| JP | 2001-105795 A | | 4/2001 | |
| JP | 2006-153990 A | | 6/2006 | |
| JP | 2010-120230 A | | 6/2010 | |
| JP | 2012-201016 A | | 10/2012 | |

(Continued)

OTHER PUBLICATIONS

Takasago—WO 2018-186184 A1—PCT D1—MT—decorative sheet—2018 (Year: 2018).*

(Continued)

*Primary Examiner* — John Vincent Lawler
(74) *Attorney, Agent, or Firm* — SOLARIS Intellectual Property Group, PLLC

(57) ABSTRACT

The present disclosure provides a decorative film including a base material and an optical reflective layer coloring by optical interference or structural color, in which at least two or more layers of the optical reflective layer are laminated, and diffuse reflectivities of the respective optical reflective layers are different from each other, or a printing layer is laminated between the respective optical reflective layers; a decorative molded article; a decorative panel; and an electronic device.

16 Claims, 5 Drawing Sheets

(56) References Cited

FOREIGN PATENT DOCUMENTS

| JP | 2015-072410 | A |   | 4/2015  |               |
|----|-------------|---|---|---------|---------------|
| JP | 2017-097114 | A |   | 6/2017  |               |
| JP | 2018124431  | A | * | 8/2018  | ............. B32B 33/00 |
| WO | WO-2015190428 | A1 | * | 12/2015 | ............. B32B 7/023 |
| WO | WO-2018186184 | A1 | * | 10/2018 | ........... G02B 5/0833 |
| WO | 2019/021755 | A1 |   | 1/2019  |               |
| WO | 2020/122235 | A1 |   | 6/2020  |               |

OTHER PUBLICATIONS

Inada—JP 2018-124431 A—MT—decorative film—Aug. 2018 (Year: 2018).*
Yu—CN 109613637 A—MT—decorative film—Apr. 2019 (Year: 2019).*
Tomohisa—WO 2015-190428 A1—MT—image display w—layers w polarization—2015 (Year: 2015).*
International Search Report issued in International Application No. PCT/JP2021/034417 on Nov. 9, 2021.
Written Opinion of the ISA issued in International Application No. PCT/JP2021/034417 on Nov. 9, 2021.
English language translation of the following: Office action dated May 28, 2024 from the JPO in a Japanese patent application No. 2022-550638 corresponding to the instant patent application.

\* cited by examiner

DECORATIVE FILM, DECORATIVE MOLDED ARTICLE, DECORATIVE PANEL, AND ELECTRONIC DEVICE

CROSS-REFERENCE TO RELATED APPLICATIONS

This application is a continuation application of International Application No. PCT/JP2021/034417, filed Sep. 17, 2021, the disclosure of which is incorporated herein by reference in its entirety. Further, this application claims priority from Japanese Patent Application No. 2020-156576, filed Sep. 17, 2020, the disclosure of which is incorporated herein by reference in its entirety.

BACKGROUND OF THE INVENTION

1. Field of the Invention

The present disclosure relates to a decorative film, a decorative molded article, a decorative panel, and an electronic device.

2. Description of the Related Art

A decorative molded article, in which a decorative film is disposed on a surface of a resin molded article to color the surface in a desired color tone or to provide a desired pattern on the surface of the resin molded article, has been known. The decorative molded article is obtained, for example, by previously disposing a decorative film in a mold and injection-molding a base material resin into the mold, thereby having a structure in which the surface of the resin molded article is integrated with the decorative film. The injection mold of the base material resin after previously disposing the decorative film in the mold is generally referred to as film insert molding or simply insert molding. In addition, the decorative molded article may be manufactured by attaching a decorative film to a molded article after molding.

As a hot stamp foil in the related art, JP2001-105795A discloses a hot stamp foil characterized in that a cholesteric liquid crystalline polymer layer having a selective reflection wavelength range in visible light is laminated as a transfer layer. In addition, JP2017-97114A discloses that retroreflective property is improved by subjecting a cholesteric liquid crystal layer to an uneven processing.

SUMMARY OF THE INVENTION

An object to be achieved by one embodiment of the present disclosure is to provide a decorative film having high lustrousness, high chroma saturation, and a rich tint change depending on a viewing direction.

An object to be achieved by another embodiment of the present disclosure is to provide a decorative molded article using the decorative film.

An object to be achieved by still another embodiment of the present disclosure is to provide a decorative panel using the decorative film.

An object to be achieved by still another embodiment of the present disclosure is to provide an electronic device using the decorative panel.

The present disclosure includes the following aspects.

<1> A decorative film comprising:
a base material; and
an optical reflective layer coloring by optical interference or structural color, in which at least two or more layers of the optical reflective layer are laminated, and diffuse reflectivities of the respective optical reflective layers are different from each other, or a printing layer is laminated between the respective optical reflective layers.

<2> The decorative film according to <1>,
in which at least one layer of the optical reflective layers is a layer including a cholesteric liquid crystal compound.

<3> A decorative molded article comprising:
the decorative film according to <1> or <2>.

<4> A decorative panel comprising:
the decorative film according to <1> or <2>.

<5> An electronic device comprising:
the decorative panel according to <4>.

According to one embodiment of the present disclosure, it is possible to provide a decorative film having high lustrousness, high chroma saturation, and a rich tint change depending on a viewing direction.

According to another embodiment of the present disclosure, a decorative molded article using the decorative film is provided.

According to still another embodiment of the present disclosure, a decorative panel using the decorative film is provided.

According to still another embodiment of the present disclosure, an electronic device using the decorative panel is provided.

DESCRIPTION OF THE PREFERRED EMBODIMENTS

Figure 1:
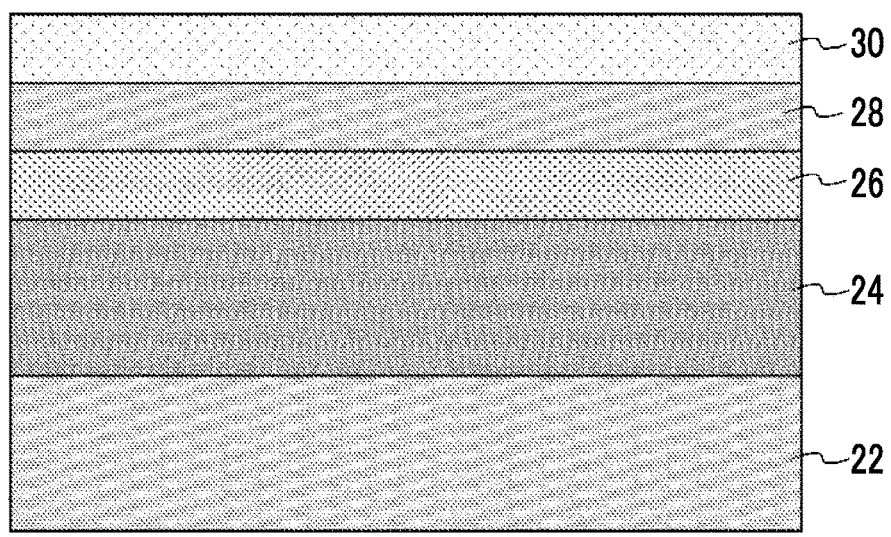
FIG. 1 is a schematic cross-sectional view showing an example of a decorative film according to an embodiment of the present disclosure.

Hereinafter, embodiments of the decorative film, the decorative molded article, the decorative panel, and the electronic device according to the present disclosure will be described. However, the present disclosure is not limited to the following embodiments, and can be implemented with appropriate modification within the scope of the object of the present disclosure. In a case where the embodiments of the present disclosure are described with reference to the drawings, the description of overlapping constituent elements and reference numerals may be omitted. The constituent elements indicated by the same reference numeral in the drawings mean the same constituent element. A dimensional ratio in the drawings does not necessarily represent the actual dimensional ratio.

In a case where substitution or unsubstitution is not noted in regard to the notation of a "group" (atomic group) in the present disclosure, the "group" includes not only a group not having a substituent but also a group having a substituent. For example, an "alkyl group" includes not only an alkyl group having no substituent (unsubstituted alkyl group), but also an alkyl group having a substituent (substituted alkyl group).

In the present disclosure, "light" means an actinic ray or radiation.

In the present disclosure, "actinic ray" or "radiation" means, for example, a bright line spectrum of a mercury lamp, far ultraviolet ray typified by an excimer laser, extreme ultraviolet ray (EUV light), X-ray, electron beam (EB), and the like.

In the present disclosure, unless otherwise specified, "exposure" includes not only exposure by a bright line spectrum of a mercury lamp, far ultraviolet ray typified by an excimer laser, extreme ultraviolet ray (EUV light), X-ray, and the like, but also exposure by a particle beam such as an electron beam and an ion beam.

In the present disclosure, "to" is used to refer to a meaning including numerical values denoted before and after "to" as a lower limit value and an upper limit value.

In the present disclosure, (meth)acrylate represents acrylate and methacrylate, and (meth)acrylic represents acrylic and methacrylic.

In the present disclosure, a weight-average molecular weight (Mw), a number-average molecular weight (Mn), and a dispersity (also referred to as molecular weight distribution) (Mw/Mn) of a resin component are defined as a value in terms of polystyrene according to a gel permeation chromatography (GPC) measurement (solvent: tetrahydrofuran, flow amount (sample injection amount): 10 μL, column: TSK gel Multipore HXL-M manufactured by Tosoh Corporation, column temperature: 40° C., flow rate: 1.0 μmL/min, detector: refractive index detector) using a GPC device (HLC-8120GPC manufactured by Tosoh Corporation).

In the present disclosure, in a case where a plurality of substances corresponding to each component in a composition is present, the amount of each component in the composition means the total amount of the plurality of substances present in the composition, unless otherwise specified.

In the present disclosure, a term "step" denotes not only an individual step but also a step which is not clearly distinguishable from another step as long as an effect expected from the step can be achieved.

In the present disclosure, a "total solid content" refers to a total mass of components obtained by removing a solvent from the whole composition of the composition. In addition, a "solid content" is a component obtained by removing a solvent from the whole composition of the composition, and for example, the component may be solid or may be liquid at 25° C.

In addition, in the present disclosure, a combination of two or more preferred aspects is a more preferred aspect.

(Decorative Film)

The decorative film according to one embodiment of the present disclosure includes a base material and an optical reflective layer coloring by optical interference or structural color, in which at least two or more layers of the optical reflective layer are laminated. Furthermore, in the decorative film according to one embodiment of the present disclosure, diffuse reflectivities of the respective optical reflective layers are different from each other, or a printing layer is laminated between the respective optical reflective layers.

An application of the decorative film according to one embodiment of the present disclosure is not particularly limited, and specific examples thereof include a decoration of electronic devices (for example, wearable devices and smartphones), home appliances, audio products, computers, displays, in-vehicle products, watches, accessories, optical parts, doors, window glasses, and building materials. Among these, the decorative film according to one embodiment of the present disclosure can be suitably used for a decoration of electronic devices (for example, wearable devices and smartphones). In addition, since the decorative film according to one embodiment of the present disclosure has excellent three-dimensional moldability, the decorative film according to one embodiment of the present disclosure is suitable as a decorative film for molding, which is used for molding such as three-dimensional molding and insert molding, and more suitable as a decorative film for three-dimensional molding.

In the related art, as a surface decoration used in articles such as home appliances, electronic apparatuses, and mobile phones, for example, printing, painting, vapor deposition, or plating has been used. However, for example, from the aspects of problems such as functionality addition and environmental load, and the possibility of replacement, a decoration technique by using a decorative film has been widely used. On the other hand, new designability is required from the widespread preference of users. In particular, change in color (for example, a tint and a fine hue) depending on a viewing angle is one of required designs, and a need for introducing the decoration technique to obtain the designs has been required. In addition, in JP2001-105795A, a hot stamp foil in which a cholesteric liquid crystalline polymer layer is laminated as a transfer layer is disclosed, but in some cases, a tint change depending on a viewing direction is insufficient. In addition, in JP2017-97114A, it is disclosed that retroreflective property is improved by subjecting a cholesteric liquid crystal layer to an uneven processing, but there is no disclosure of its use as a decorative film and its effects.

As a result of intensive studies by the present inventors, it has been found that, according to the decorative film including the above-described configuration, a decorative film having high lustrousness, high chroma saturation, and a rich tint change depending on a viewing direction (for example, a decorative film which is useful as a material for a decorative molded article) is provided.

In the decorative film according to the embodiment of the present disclosure, a plurality of optical reflective layers are laminated. By laminating a plurality of optical reflective layers, a decorative film having high lustrousness can be provided.

In addition, in a certain aspect of the decorative film according to one embodiment of the present disclosure, the respective optical reflective layers have different diffuse reflectivity. Since the diffuse reflectivities are different from each other, reflected tint of each optical reflective layer is visually recognized independently, and it is possible to provide a high-impact design which has a rich hue (that is, high chroma saturation) and a large tint change depending on a viewing angle (that is, a rich tint change depending on the viewing direction).

In addition, in another aspect of the decorative film according to one embodiment of the present disclosure, a printing layer is provided between the respective optical reflective layers. By including the printing layer, the printing layer absorbs complementary color light transmitted from the optical reflective layer of the upper layer, and color of each optical reflective layer can be visually recognized without being mixed in color with the optical reflective layer of the lower layer. As a result of expanding expression range of color tone by the combination of the color due to the printing layer and the reflected color, it is possible to provide a design which has a large tint change depending on the viewing angle (that is, a rich tint change depending on the viewing direction) and a rich hue (that is, high chroma saturation).

In the present disclosure, the "having a rich tint change depending on a viewing direction" means that, for example, there is a large change in tint between a case where an object is viewed from an angle perpendicular to a surface direction of the object and a case where the object is viewed at an angle of 45° with respect to the surface direction of the object. The above-described effect is preferable in that impact of a design can be improved.

Hereinafter, the decorative film according to the embodiment of the present disclosure will be described in detail.

<Base Material>

The decorative film according to one embodiment of the present disclosure includes a base material. The base material may be a support. As the base material, for example, a known base material in the related art as a base material used for molding such as three-dimensional molding and insert molding can be used without particular limitation, and may be appropriately selected according to suitability for molding. In addition, a shape and a material of the base material are not particularly limited, and may be appropriately selected as desired. From the viewpoint of ease of molding and chipping resistance, the base material is preferably a resin base material, and more preferably a resin film.

Specific examples of the base material include a resin film including a resin such as polyethylene terephthalate (PET), polyethylene naphthalate (PEN), an acrylic resin, a urethane resin, a urethane-acrylic resin, polycarbonate (PC), an acrylic-polycarbonate resin, triacetyl cellulose (TAC), cycloolefin polymer (COP), and acrylonitrile/butadiene/styrene copolymer resin (ABS resin). Among these, from the viewpoint of moldability and strength, the base material is preferably polyethylene terephthalate (PET), an acrylic resin, polycarbonate, or polypropylene, and more preferably polyethylene terephthalate (PET), an acrylic resin, or polycarbonate. In addition, the base material may be a laminated resin base material having two or more layers. Preferred examples thereof include a laminated film including an acrylic resin layer and a polycarbonate layer.

The base material may contain other additives as necessary. Examples of such additives include lubricants (for example, mineral oil, hydrocarbons, fatty acids, alcohols, fatty acid esters, fatty acid amides, metallic soaps, natural waxes, and silicone), inorganic flame retardants (for example, magnesium hydroxide and aluminum hydroxide), a halogen-based organic flame retardant, a phosphorus-based organic flame retardant, organic or inorganic fillers (for example, metal powder, talc, calcium carbonate, potassium titanate, glass fibers, carbon fibers, and wood powder), an antioxidant, an ultraviolet inhibitor, a sliding agent, a dispersant, a coupling agent, a foaming agent, a colorant, and engineering plastics other than the above-described resins. Examples of the engineering plastics include polyolefins, polyesters, polyacetals, polyamides, and polyphenylene ethers.

As the base material, a commercially available product may be used. Examples of the commercially available product include TECHNOLLOY (registered trademark) series (acrylic resin film or acrylic resin/polycarbonate resin laminated film, manufactured by Sumitomo Chemical Co., Ltd.), ABS films (manufactured by Okamoto Industries, Inc.), ABS sheets (manufactured by SEKISUI SEIKEI CO., LTD.), Teflex (registered trademark) series (PET film, manufactured by TEIJIN FILM SOLUTIONS LIMITED), Lumirror (registered trademark) easily moldable type (PET film, manufactured by TORAY INDUSTRIES, INC), and Purethermo (polypropylene film, manufactured by Idemitsu Kosan Co., Ltd.).

A thickness of the base material is determined according to, for example, the application of a molded product to be produced and handleability, and is not particularly limited. The lower limit of the thickness of the base material is preferably 1 µm or more, more preferably 10 µm or more, still more preferably 20 µm or more, and particularly preferably 30 µm or more. The upper limit of the thickness of the base material is preferably 500 µm or less, more preferably 200 µm or less, and particularly preferably 100 µm or less.

<Optical Reflective Layer>

The decorative film according to one embodiment of the present disclosure includes an optical reflective layer coloring by optical interference or structural color, in which at least two or more layers of the optical reflective layer are laminated.

Examples of the optical reflective layer include a layer including a cholesteric liquid crystal compound (hereinafter, also simply referred to as a "cholesteric liquid crystal layer"), a layer including flat metal particles, an optical multilayer film, a metal thin film, and a layer including a chromic material. Among the above-described optical reflective layers, from the viewpoint of easily obtaining lustrousness, a cholesteric liquid crystal layer, a metal thin film (hereinafter, may be referred to as a "mirror layer"), or a layer including an optical multilayer film is preferable, a cholesteric liquid crystal layer or a metal thin film is more preferable, and a cholesteric liquid crystal layer is particularly preferable. In addition, from the viewpoint of easily obtaining lustrousness, it is preferable that at least one layer of the optical reflective layers is a cholesteric liquid crystal layer.

A material of the metal thin film is preferably a metal which is not easily oxidized, such as In, Ag, and Zn, and it is preferable to form the thin film layer by using a vapor phase method such as vapor deposition and sputtering process. From the viewpoint of high brightness, In is more preferable.

<<Liquid Crystal Composition>>

The cholesteric liquid crystal layer is a layer including a cholesteric liquid crystal compound, is formed by curing a liquid crystal composition. The liquid crystal composition is a composition containing a cholesteric liquid crystal compound. From the viewpoint of moldability and temporary support peeling property, as the cholesteric liquid crystal compound used in the present disclosure, it is preferable to use at least a cholesteric liquid crystal compound having one ethylenically unsaturated group or one cyclic ether group. For example, the liquid crystal composition for forming the cholesteric liquid crystal layer contains, with respect to a total solid content of the liquid crystal composition, 25% by mass or more of the cholesteric liquid crystal compound having one ethylenically unsaturated group or one cyclic ether group, and furthermore, may contain other components (for example, a chiral agent, an alignment control agent, a polymerization initiator, and an alignment assistant).

—Cholesteric Liquid Crystal Compound Having One Ethylenically Unsaturated Group or One Cyclic Ether Group—

It is preferable that the liquid crystal composition contains, as the cholesteric liquid crystal compound, 25% by mass or more of a cholesteric liquid crystal compound (hereinafter, also referred to as a "specific liquid crystal compound") having one ethylenically unsaturated group or one cyclic ether group.

The ethylenically unsaturated group in the specific liquid crystal compound is not particularly limited, and examples thereof include a (meth)acryloxy group, a (meth)acrylamide group, a vinyl group, a vinyl ester group, and a vinyl ether group. As the ethylenically unsaturated group, from the viewpoint of reactivity, a (meth)acryloxy group, a (meth)acrylamide group, or an aromatic vinyl group is preferable, a (meth)acryloxy group or a (meth)acrylamide group is more preferable, and a (meth)acryloxy group is particularly preferable.

The cyclic ether group in the specific liquid crystal compound is not particularly limited, but from the viewpoint of reactivity, an epoxy group or an oxetanyl group is preferable, and an oxetanyl group is particularly preferable.

From the viewpoint of reactivity, and suppressing change in reflectance and change in tint after molding, the specific liquid crystal compound is preferably a cholesteric liquid crystal compound having one ethylenically unsaturated group. The liquid crystal composition more preferably contains 25% by mass or more of the cholesteric liquid crystal compound having one ethylenically unsaturated group with respect to the total solid content of the liquid crystal composition.

The specific liquid crystal compound may have both ethylenically unsaturated group and cyclic ether group in one molecule, but it is assumed that the number of ethylenically unsaturated groups is 1 or the number of cyclic ether groups is 1. In addition, in a case where the number of ethylenically unsaturated groups in the specific liquid crystal compound is 1, for example, the specific liquid crystal compound may be a compound having one ethylenically unsaturated group and one or more cyclic ether groups.

In a case where the liquid crystal composition includes a cholesteric liquid crystal compound having one ethylenically unsaturated group, from the viewpoint of suppressing change in reflectance and change in tint after molding, the above-described liquid crystal composition preferably includes a radical polymerization initiator, and more preferably includes a photoradical polymerization initiator.

In a case where the liquid crystal composition includes a cholesteric liquid crystal compound having one cyclic ether group, from the viewpoint of suppressing change in reflectance and change in tint after molding, the above-described liquid crystal composition preferably includes a cationic polymerization initiator, and more preferably includes a photocationic polymerization initiator.

From the viewpoint of suppressing change in reflectance and change in tint after molding, the specific liquid crystal compound is preferably a cholesteric liquid crystal compound having both ethylenically unsaturated group and cyclic ether group, and more preferably a cholesteric liquid crystal compound having one ethylenically unsaturated group and one cyclic ether group.

It is sufficient that the specific liquid crystal compound is a compound having a liquid crystal structure, and the specific liquid crystal compound may be a rod-like liquid crystal compound or a disk-like liquid crystal compound. From the viewpoint of ease of adjusting a pitch of a helical structure in the cholesteric liquid crystal layer, and viewpoint of suppressing change in reflectance and change in tint after molding, the specific liquid crystal compound is preferably a rod-like liquid crystal compound.

As the rod-like liquid crystal compound, azomethines, azoxys, cyano biphenyls, cyanophenyl esters, benzoic acid esters, cyclohexane carboxylic acid phenyl esters, cyanophenyl cyclohexanes, cyano-substituted phenyl pyrimidines, alkoxy-substituted phenyl pyrimidines, phenyl dioxanes, tolanes, or alkenylcyclohexylbenzonitriles are preferably used. In addition to the above-described low-molecular weight liquid crystal compounds, a liquid crystalline polymer compound can also be used. As the rod-like liquid crystal compound, a compound having one ethylenically unsaturated group or one cyclic ether group, among compounds described in "Makromol. Chem., vol. 190, p. 2255 (1989), Advanced Materials, vol. 5, p. 107 (1993)", U.S. Pat. Nos. 4,683,327A, 5,622,648A, 5,770,107A, WO1995/022586A, WO1995/024455A, WO1997/000600A, WO1998/023580A, WO1998/052905A, JP1989-272551A (JP-H1-272551A), JP1994-16616A (JP-H6-16616A), JP1995-110469A (JP-H7-110469A), JP1999-80081A (JP-H11-80081A), and JP2001-328973A, can be used. Furthermore, as the rod-like liquid crystal compound, for example, a compound having one ethylenically unsaturated group or one cyclic ether group, among compounds described in JP1999-513019A (JP-H11-513019A) and JP2007-279688A, can also be preferably used. The cholesteric liquid crystal layer is more preferably a layer in which the alignment is fixed by polymerizing the rod-like liquid crystal compound.

As the discotic liquid crystal compound, for example, a compound having one ethylenically unsaturated group or one cyclic ether group, among compounds described in JP2007-108732A or JP2010-244038A, can be preferably used.

Preferred specific examples of the specific liquid crystal compound include compounds shown below, but it is needless to say that the specific liquid crystal compound is not limited thereto.

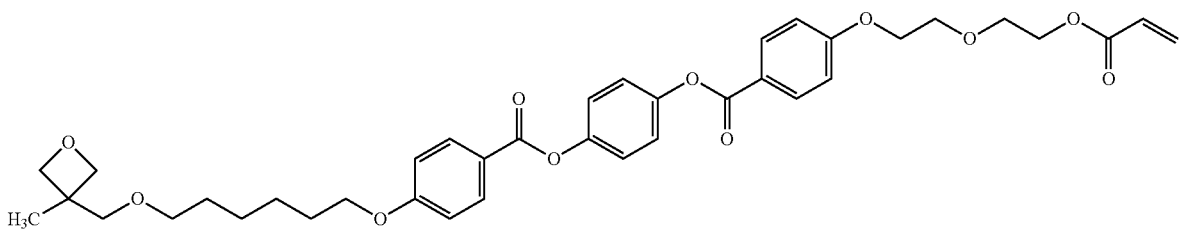

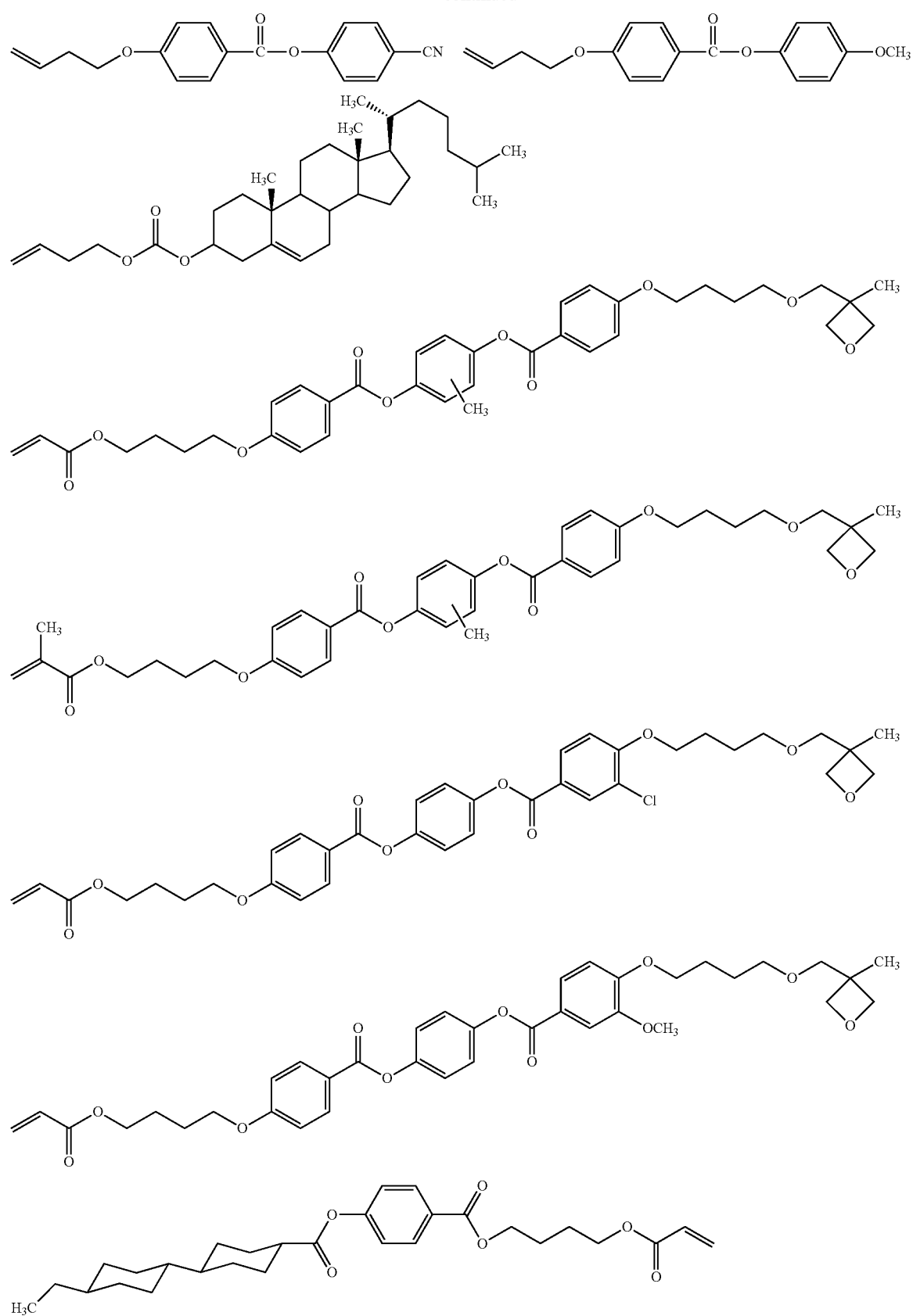

-continued

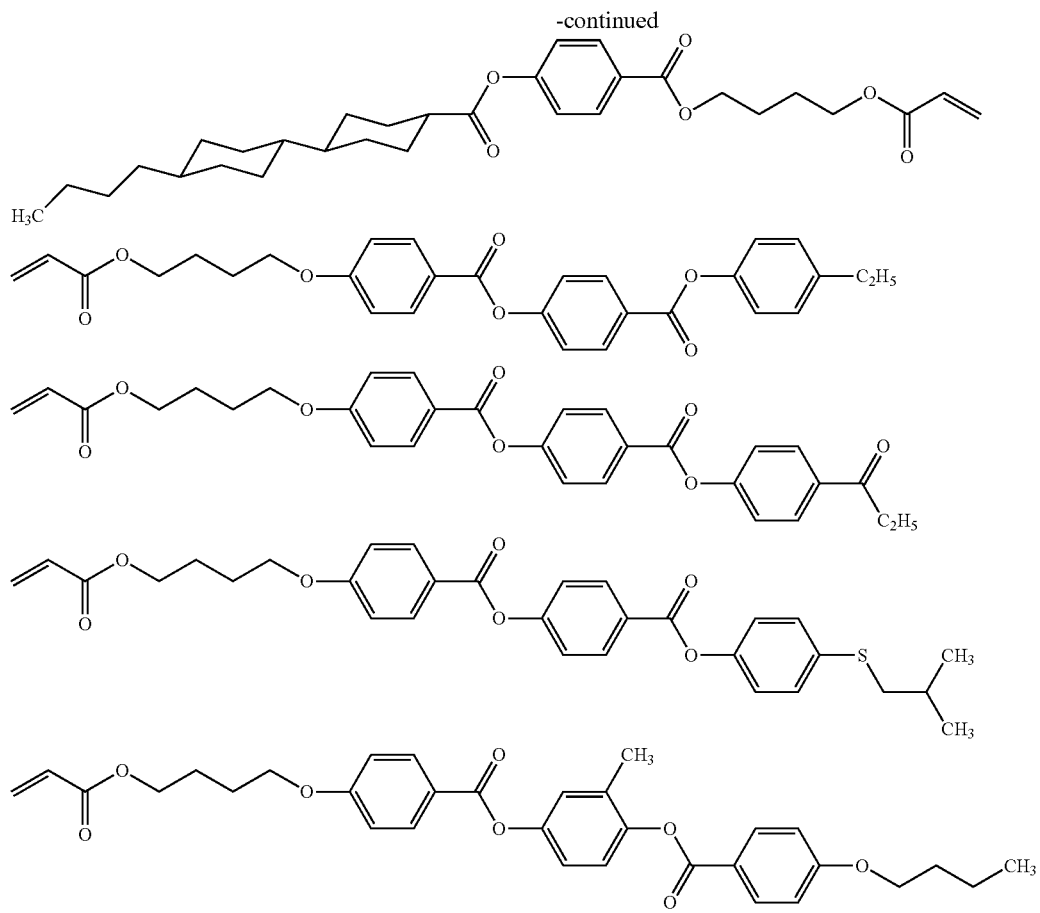

The liquid crystal composition may include one specific liquid crystal compound alone, or may include two or more specific liquid crystal compounds. A content of the specific liquid crystal compound is preferably 25% by mass or more with respect to the total solid content of the liquid crystal composition. In a case where the content of the specific liquid crystal compound is 25% by mass or more, a decorative film which has a small change in reflectance after molding is obtained. In addition, from the viewpoint of suppressing change in reflectance and change in tint after molding, with respect to the total solid content of the liquid crystal composition, the content of the specific liquid crystal compound is preferably 30% by mass or more, more preferably 40% by mass or more, still more preferably 60% by mass to 99% by mass, and particularly preferably 80% by mass to 98% by mass.

—Other Cholesteric Liquid Crystal Compound—

The liquid crystal composition may include other cholesteric liquid crystal compounds (hereinafter, also simply referred to as "other liquid crystal compounds") other than the specific liquid crystal compound. Examples of other liquid crystal compounds include cholesteric liquid crystal compounds having no ethylenically unsaturated group and cyclic ether group, cholesteric liquid crystal compounds having two or more ethylenically unsaturated groups and no cyclic ether group, cholesteric liquid crystal compounds having two or more cyclic ether groups and no ethylenically unsaturated group, and cholesteric liquid crystal compounds having two or more ethylenically unsaturated groups and two or more cyclic ether groups. Among these, from the viewpoint of suppressing change in reflectance and change in tint after molding, the other liquid crystal compounds are preferably at least one compound selected from the group consisting of cholesteric liquid crystal compounds having no ethylenically unsaturated group and no cyclic ether group, cholesteric liquid crystal compounds having two or more ethylenically unsaturated groups and no cyclic ether group, and cholesteric liquid crystal compounds having two or more cyclic ether groups and no ethylenically unsaturated group, more preferably at least one compound selected from the group consisting of cholesteric liquid crystal compounds having no ethylenically unsaturated group and no cyclic ether group, cholesteric liquid crystal compounds having two ethylenically unsaturated groups and no cyclic ether group, and cholesteric liquid crystal compounds having two or more cyclic ether groups and no ethylenically unsaturated group, and particularly preferably at least one compound selected from the group consisting of cholesteric liquid crystal compounds having no ethylenically unsaturated group and no cyclic ether group or cholesteric liquid crystal compounds having two ethylenically unsaturated groups and no cyclic ether group.

As the other liquid crystal compounds, a known cholesteric liquid crystal compound can be used. As a rod-like liquid crystal compound in the other liquid crystal compounds, for example, compounds described in "Makromol. Chem., vol. 190, p. 2255 (1989), Advanced Materials, vol. 5, p. 107 (1993)", U.S. Pat. Nos. 4,683,327A, 5,622,648A, 5,770,107A, WO1995/022586A, WO1995/024455A, WO1997/000600A, WO1998/023580A, WO1998/

052905A, JP1989-272551A (JP-H1-272551A), JP1994-16616A (JP-H6-16616A), JP1995-110469A (JP-H7-110469A), JP1999-80081A (JP-H11-80081A), and JP2001-328973A can be used. Furthermore, as the rod-like liquid crystal compound in the other liquid crystal compounds, for example, compounds described in JP1999-513019B (JP-H11-513019B) or JP2007-279688A can be preferably used. As the discotic liquid crystal compound in the other liquid crystal compounds, for example, compounds described in JP2007-108732A or JP2010-244038A can be preferably used.

The liquid crystal composition may include other liquid crystal compound alone, or may include two or more other liquid crystal compounds. From the viewpoint of suppressing change in reflectance and change in tint after molding, with respect to the total solid content of the liquid crystal composition, the content of the other liquid crystal compounds is preferably 70% by mass or less, more preferably 60% by mass or less, still more preferably 40% by mass or less, and particularly preferably 5% by mass or less. The lower limit value of the content of the other liquid crystal compounds is 0% by mass.

—Chiral Agent (Optically Active Compound)—

From the viewpoint of ease of forming a cholesteric liquid crystal layer and ease of adjusting the pitch of the helical structure, the liquid crystal composition preferably includes a chiral agent (that is, an optically active compound). The chiral agent has a function of inducing a helical structure in the cholesteric liquid crystal layer. Since a twist direction or helical pitch of the helix induced by the chiral agent is different depending on the liquid crystal compound, the chiral agent may be selected according to the purpose. The chiral agent is not particularly limited, and a known compound (for example, a chiral agent for twisted nematic (TN) and super-twisted nematic (STN), compound described in "Liquid Crystal Device Handbook", Chapter 3, Section 4-3, p. 199, Japan Society for the Promotion of Science edited by the 142nd committee, 1989), and an isosorbide or isomannide derivative can be used. The chiral agent generally includes an asymmetric carbon atom, but an axially asymmetric compound or a surface asymmetric compound, which does not have the asymmetric carbon atom, can also be used as the chiral agent. Preferred examples of the axially asymmetric compound or the surface asymmetric compound include a binaphthyl compound, a helicene compound, and a paracyclophane compound.

From the viewpoint of suppressing change in reflectance after molding, the liquid crystal composition preferably includes, as the chiral agent, a chiral agent having a polymerizable group, and more preferably includes, as the chiral agent, a chiral agent having a polymerizable group and a chiral agent not having a polymerizable group. The polymerizable group is not particularly limited as long as the group is polymerizable, but from the viewpoint of reactivity and viewpoint of suppressing change in reflectance after molding, the polymerizable group is preferably an ethylenically unsaturated group or a cyclic ether group, and more preferably an ethylenically unsaturated group. Preferred aspects of the ethylenically unsaturated group and cyclic ether group in the chiral agent are the same as the preferred aspects of the ethylenically unsaturated group and cyclic ether group in the above-described specific liquid crystal compound, respectively.

In a case where the chiral agent has an ethylenically unsaturated group or a cyclic ether group, from the viewpoint of reactivity and viewpoint of suppressing change in reflectance after molding, it is preferable that the ethylenically unsaturated group or cyclic ether group included in the specific liquid crystal compound has the same type of the ethylenically unsaturated group or cyclic ether group included in the chiral agent (for example, an ethylenically unsaturated group, preferably a (meth)acryloxy group), and it is more preferable to be the same group.

From the viewpoint of reactivity and viewpoint of suppressing change in reflectance after molding, the chiral agent having a polymerizable group is preferably a chiral agent having two or more polymerizable groups, more preferably a chiral agent having two or more ethylenically unsaturated groups or a chiral agent having two or more cyclic ether groups, and particularly preferably a chiral agent having two or more ethylenically unsaturated groups.

The chiral agent may be a cholesteric liquid crystal compound.

As will be described later, in a case of controlling a size of the helical pitch of the cholesteric liquid crystal layer by irradiating the cholesteric liquid crystal layer with light during manufacturing of the cholesteric liquid crystal layer, the liquid crystal composition preferably includes a chiral agent (hereinafter, also referred to as a "photosensitive chiral agent") capable of changing the helical pitch of the cholesteric liquid crystal layer in response to light. The photosensitive chiral agent is a compound in which the structure can be changed by absorbing light, thereby being capable of changing the helical pitch of the cholesteric liquid crystal layer. As such a compound, a compound which causes at least one of a photoisomerization reaction, a photodimerization reaction, or a photodegradation reaction is preferable. The compound which causes a photoisomerization reaction refers to a compound which causes stereoisomerization or structural isomerization by the action of light. Examples of the compound which causes a photoisomerization reaction include an azobenzene compound and a spiropyran compound. In addition, the compound which causes a photodimerization reaction refers to a compound which causes an addition reaction between two groups so as to be cyclized by irradiation with light. Examples of the compound which causes a photodimerization reaction include a cinnamic acid derivative, a coumarin derivative, a chalcone derivative, and a benzophenone derivative. In addition, the light is not particularly limited, and examples thereof include ultraviolet light, visible light, and infrared light.

Preferred examples of the photosensitive chiral agent include a chiral agent represented by Formula (CH1). The chiral agent represented by Formula (CH1) can change the alignment structure such as the helical pitch (for example, helical cycle and twist cycle) of a cholesteric liquid crystalline phase according to the amount of light during irradiation with the light.

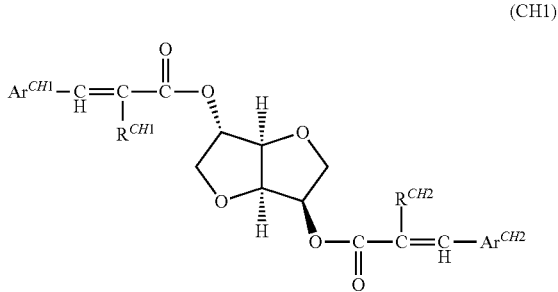

In Formula (CH1), $Ar^{CH1}$ and $Ar^{CH2}$ each independently represent an aryl group or a heteroaromatic ring group, and $R^{CH1}$ and $R^{CH2}$ each independently represent a hydrogen atom or a cyano group.

In Formula (CH1), it is preferable that $Ar^{CH1}$ and $Ar^{CH2}$ are each independently an aryl group. The aryl group of $Ar^{CH1}$ and $Ar^{CH2}$ in Formula (CH1) preferably has a total carbon number of 6 to 40, and more preferably has a total carbon number of 6 to 30. The aryl group may have a substituent. As the substituent, for example, a halogen atom, an alkyl group, an alkenyl group, an alkynyl group, an alkoxy group, a hydroxy group, an acyl group, an alkoxycarbonyl group, an aryloxycarbonyl group, an acyloxy group, a carboxy group, a cyano group, or a heterocyclic group is preferable, and a halogen atom, an alkyl group, an alkenyl group, an alkoxy group, a hydroxy group, an acyloxy group, an alkoxycarbonyl group, or an aryloxycarbonyl group is more preferable.

As $Ar^{CH1}$ and $Ar^{CH2}$, an aryl group represented by Formula (CH2) or Formula (CH3) is preferable.

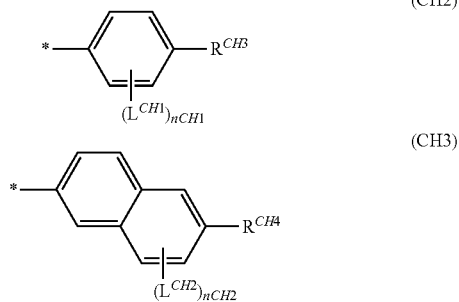

In Formula (CH2) and Formula (CH3), $R^{CH3}$ and $R^{CH4}$ each independently represent a hydrogen atom, a halogen atom, an alkyl group, an alkenyl group, an alkynyl group, an aryl group, a heterocyclic group, an alkoxy group, a hydroxy group, an acyl group, an alkoxycarbonyl group, an aryloxycarbonyl group, an acyloxy group, a carboxy group, or a cyano group, $L^{CH1}$ and $L^{CH2}$ each independently represent a halogen atom, an alkyl group, an alkoxy group, or a hydroxy group, nCH1 represents an integer of 0 to 4, nCH2 represents an integer of 0 to 6, and * represents a bonding position with C forming an ethylene unsaturated bond in Formula (CH1).

In Formula (CH2) and Formula (CH3), $R^{CH3}$ and $R^{CH4}$ are each independently preferably a hydrogen atom, a halogen atom, an alkyl group, an alkenyl group, an aryl group, an alkoxy group, a hydroxy group, an alkoxycarbonyl group, an aryloxycarbonyl group, or an acyloxy group, more preferably an alkoxy group, a hydroxy group, or an acyloxy group, and particularly preferably an alkoxy group.

In Formula (CH2) and Formula (CH3), $L^{CH1}$ and $L^{CH2}$ are each independently preferably an alkoxy group having 1 to 10 carbon atoms, or a hydroxy group. nCH1 in Formula (CH2) is preferably 0 or 1. nCH2 in Formula (CH3) is preferably 0 or 1.

The heteroaromatic ring group of $Ar^{CH1}$ and $Ar^{CH2}$ in Formula (CH1) preferably has a total carbon number of 4 to 40, and more preferably has a total carbon number of 4 to 30. The heteroaromatic ring group may have a substituent. As the substituent, for example, a halogen atom, an alkyl group, an alkenyl group, an alkynyl group, an aryl group, an alkoxy group, a hydroxy group, an acyl group, an alkoxycarbonyl group, an aryloxycarbonyl group, an acyloxy group, or a cyano group is preferable, and a halogen atom, an alkyl group, an alkenyl group, an aryl group, an alkoxy group, or an acyloxy group is more preferable. As the heteroaromatic ring group, a pyridyl group, a pyrimidinyl group, a furyl group, or a benzofuranyl group is preferable, and a pyridyl group or a pyrimidinyl group is more preferable.

In Formula (CH1), it is preferable that $R^{CH1}$ and $R^{CH2}$ are each independently a hydrogen atom.

The liquid crystal composition may include one chiral agent alone, or may include two or more chiral agents. A content of the chiral agent can be appropriately selected according to a desired pitch of the structure and a helical structure of the specific liquid crystal compound to be used. From the viewpoint of ease of forming a cholesteric liquid crystal layer and ease of adjusting the pitch of the helical structure, and viewpoint of suppressing change in reflectance after molding, the content of the chiral agent is preferably 1% by mass to 20% by mass, more preferably 2% by mass to 15% by mass, and particularly preferably 3% by mass to 10% by mass with respect to the total solid content of the liquid crystal composition.

In a case where the liquid crystal composition contains a chiral agent having a polymerizable group as the chiral agent, from the viewpoint of suppressing change in reflectance after molding, the content of the chiral agent having a polymerizable group is preferably 0.2% by mass to 15% by mass, more preferably 0.5% by mass to 10% by mass, still more preferably 1% by mass to 8% by mass, and particularly preferably 1.5% by mass to 5% by mass with respect to the total solid content of the liquid crystal composition.

In a case where the liquid crystal composition contains a chiral agent not having a polymerizable group as the chiral agent, from the viewpoint of suppressing change in reflectance after molding, the content of the chiral agent not having a polymerizable group is preferably 0.2% by mass to 20% by mass, more preferably 0.5% by mass to 15% by mass, and particularly preferably 1.5% by mass to 10% by mass with respect to the total solid content of the liquid crystal composition.

In addition, the pitch of the helical structure of the cholesteric liquid crystal in the cholesteric liquid crystal layer, and the selective reflection wavelength and its range described later can be easily changed not only by adjusting the type of the liquid crystal compound used but also by adjusting the content of the chiral agent. Although it cannot be said unconditionally, in a case where the content of the chiral agent in the liquid crystal composition is doubled, the above-described pitch may be halved and the center value of the above-described selective reflection wavelength may be halved.

—Polymerization Initiator—

The liquid crystal composition preferably includes a polymerization initiator, and more preferably includes a photopolymerization initiator.

In a case where the liquid crystal composition includes a cholesteric liquid crystal compound having one ethylenically unsaturated group, from the viewpoint of suppressing change in reflectance and change in tint after molding, the above-described liquid crystal composition preferably includes a radical polymerization initiator, and more preferably includes a photoradical polymerization initiator.

In a case where the liquid crystal composition includes a cholesteric liquid crystal compound having one cyclic ether group, from the viewpoint of suppressing change in reflectance and change in tint after molding, the above-described liquid crystal composition preferably includes a cationic polymerization initiator, and more preferably includes a photocationic polymerization initiator.

It is preferable that the liquid crystal composition includes only one of the radical polymerization initiator or the cationic polymerization initiator as the polymerization initiator.

As the polymerization initiator, a known polymerization initiator can be used. In addition, the polymerization initiator is preferably a photopolymerization initiator capable of initiating a polymerization reaction by ultraviolet irradiation. Examples of the photopolymerization initiator include α-carbonyl compounds (described in U.S. Pat. Nos. 2,367,661A and 2,367,670A), acyloin ether compounds (described in U.S. Pat. No. 2,448,828A), α-hydrocarbon-substituted aromatic acyloin compounds (described in U.S. Pat. No. 2,722,512A), polynuclear quinone compounds (described in U.S. Pat. Nos. 3,046,127A and 2,951,758A), combinations of triarylimidazole dimer and p-aminophenyl ketone (described in U.S. Pat. No. 3,549,367A), acridine compounds and phenazine compounds (described in JP1985-105667A (JP-S60-105667A) and U.S. Pat. No. 4,239,850A), and oxadiazole compounds (described in U.S. Pat. No. 4,212,970A).

As the photoradical polymerization initiator, a known photoradical polymerization initiator can be used. Preferred examples of the photoradical polymerization initiator include α-hydroxyalkylphenone compounds, α-aminoalkylphenone compounds, and acylphosphine oxide compounds.

As the photocationic polymerization initiator, a known photocationic polymerization initiator can be used. Preferred examples of the photocationic polymerization initiator include iodonium salt compounds and sulfonium salt compounds.

The liquid crystal composition may include one polymerization initiator alone, or may include two or more polymerization initiators. A content of the polymerization initiator can be appropriately selected according to a desired pitch of the structure or helical structure of the specific liquid crystal compound to be used. From the viewpoint of ease of forming a cholesteric liquid crystal layer, ease of adjusting the pitch of the helical structure, a polymerization rate, and the strength of the cholesteric liquid crystal layer, the content of the polymerization initiator is preferably 0.05% by mass to 10% by mass, more preferably 0.05% by mass to 5% by mass, still more preferably 0.1% by mass to 2% by mass, and particularly preferably 0.2% by mass to 1% by mass with respect to the total solid content of the liquid crystal composition.

—Crosslinking Agent—

The liquid crystal composition may include a crosslinking agent in order to improve the strength and durability of the cholesteric liquid crystal layer after curing. As the crosslinking agent, for example, a crosslinking agent which cures with ultraviolet rays, heat, or humidity can be suitably used. The crosslinking agent is not particularly limited and can be appropriately selected according to the purpose, and examples thereof include polyfunctional acrylate compounds such as trimethylolpropane tri(meth)acrylate and pentaerythritol tri(meth)acrylate; epoxy compounds such as glycidyl (meth)acrylate and ethylene glycol diglycidyl ether; aziridine compounds such as 2,2-bishydroxymethylbutanoltris[3-(1-aziridinyl)propionate] and 4,4-bis(ethyleneiminocarbonylamino)diphenylmethane; isocyanate compounds such as hexamethylene diisocyanate and biuret-type isocyanate; polyoxazoline compounds having an oxazoline group in the side chain; and alkoxysilane compounds such as vinyltrimethoxysilane and N-(2-aminoethyl) 3-aminopropyltrimethoxysilane. In addition, a known catalyst can be used depending on reactivity of the crosslinking agent, and in addition to improving the strength and durability of the cholesteric liquid crystal layer, productivity can be improved.

The liquid crystal composition may include one crosslinking agent alone, or may include two or more crosslinking agents. From the viewpoint of the strength and durability of the cholesteric liquid crystal layer, a content of the crosslinking agent is preferably 1% by mass to 20% by mass and more preferably 3% by mass to 15% by mass with respect to the total solid content of the liquid crystal composition.

—Polyfunctional Polymerizable Compound—

From the viewpoint of suppressing the change in reflectance after molding, the liquid crystal composition preferably includes a polyfunctional polymerizable compound and more preferably includes a polyfunctional polymerizable compound having the same type of polymerizable group. Examples of the polyfunctional polymerizable compound include, in the above-described other cholesteric liquid crystal compounds, cholesteric liquid crystal compounds having two or more ethylenically unsaturated groups and no cyclic ether group; cholesteric liquid crystal compounds having two or more cyclic ether groups and no ethylenically unsaturated group; cholesteric liquid crystal compounds having two or more ethylenically unsaturated groups and two or more cyclic ether groups; chiral agents having two or more polymerizable groups in the above-described chiral agent; and the above-described crosslinking agent.

In the liquid crystal composition, as the polyfunctional polymerizable compound, at least one compound selected from the group consisting of cholesteric liquid crystal compounds two or more ethylenically unsaturated groups and no cyclic ether group, cholesteric liquid crystal compounds having two or more cyclic ether groups and no ethylenically unsaturated group, and chiral agents having two or more polymerizable groups is preferable, and chiral agents having two or more polymerizable groups are more preferable.

The liquid crystal composition may include one polyfunctional polymerizable compound alone, or may include two or more polyfunctional polymerizable compounds. From the viewpoint of suppressing change in reflectance after molding, a content of the polyfunctional polymerizable compound is preferably 0.5% by mass to 70% by mass, more preferably 1% by mass to 50% by mass, still more preferably 1.5% by mass to 20% by mass, and particularly preferably 2% by mass to 10% by mass with respect to the total solid content of the liquid crystal composition.

—Other Additives—

The liquid crystal composition may include other additives other than the above-described components as necessary. As other additives, a known additive can be used, and examples thereof include a surfactant, a polymerization inhibitor, an antioxidant, a horizontal alignment agent, an ultraviolet absorber, a light stabilizer, a colorant, and metal oxide particles.

In addition, the liquid crystal composition may include a solvent. The solvent is not particularly limited and can be appropriately selected according to the purpose, but an organic solvent is preferably used. The organic solvent is not particularly limited and can be appropriately selected according to the purpose, and examples thereof include ketones (for example, methyl ethyl ketone and methyl isobutyl ketone), alkyl halides, amides, sulfoxides, heterocyclic compounds, hydrocarbons, esters, and ethers. The solvent may be used singly, or two or more kinds thereof may be used in combination. Among these, in consideration of environmental load, ketones are particularly preferable. In addition, the above-described component may function as the solvent.

A content of the solvent in the liquid crystal composition is not particularly limited, and may be adjusted to a content of the solvent such that a desired coatability is obtained. A content of solid contents with respect to the total mass of the liquid crystal composition is not particularly limited, but is preferably 1% by mass to 90% by mass, more preferably 5% by mass to 80% by mass, and particularly preferably 10% by mass to 80% by mass. The content of the solvent in the liquid crystal composition during curing in a case of forming the cholesteric liquid crystal layer is preferably 5% by mass or less, more preferably 3% by mass or less, still more preferably 2% by mass or less, and particularly preferably 1% by mass or less with respect to the total solid content of the liquid crystal composition. In addition, the content of the solvent in the cholesteric liquid crystal layer obtained by curing the liquid crystal composition is preferably 5% by mass or less, more preferably 3% by mass or less, still more preferably 2% by mass or less, and particularly preferably 1% by mass or less with respect to the total mass of the cholesteric liquid crystal layer.

—Coating and Curing of Liquid Crystal Composition—

In the formation of the cholesteric liquid crystal layer, for example, the liquid crystal composition is used by being applied to an object (for example, the above-described base material, and an alignment layer described later). After the liquid crystal composition is made into a solution with a solvent or made into a liquid such as a molten liquid by heating, the liquid crystal composition can be applied, for example, by an appropriate method such as a roll coating method, a gravure printing method, and a spin coating method. The liquid crystal composition can also be applied by various methods such as a wire bar coating method, an extrusion coating method, a direct gravure coating method, a reverse gravure coating method, and a die-coating method. In addition, using an inkjet device, the liquid crystal composition can be jetted from a nozzle to form a coating film (referring to a film-like liquid crystal composition formed by coating).

After the application of the liquid crystal composition, the cholesteric liquid crystal layer is formed by curing the liquid crystal composition. By curing the liquid crystal composition, the alignment state of molecules of the cholesteric liquid crystal compound (for example, the above-described specific liquid crystal compound) is maintained and fixed. The curing of the liquid crystal composition is preferably performed by a polymerization reaction of polymerizable groups (for example, ethylenically unsaturated groups or cyclic ether groups) included in the cholesteric liquid crystal compound. In a case of using the solvent as a component of the liquid crystal composition, after the application of the liquid crystal composition and before the polymerization reaction for curing, it is preferable that the coating film is dried by a known method. For example, the coating film may be dried by allowing to stand or by heating. It is sufficient that the cholesteric liquid crystal compound in the liquid crystal composition is aligned after the application and drying of the liquid crystal composition.

—Layer Configuration of Cholesteric Liquid Crystal Layer—

From the viewpoint of suppressing change in reflectance after molding, the decorative film according to one embodiment of the present disclosure preferably includes two or more cholesteric liquid crystal layers. In addition, compositions of the two or more cholesteric liquid crystal layers may be the same or different from each other. In a case where the decorative film according to one embodiment of the present disclosure includes two or more cholesteric liquid crystal layers, it is sufficient that the decorative film according to one embodiment of the present disclosure has at least one layer formed by curing a liquid crystal composition which includes, with respect to the total solid content of the liquid crystal composition, 25% by mass or more of the cholesteric liquid crystal compound having one ethylenically unsaturated group or one cyclic ether group (that is, the specific liquid crystal compound). From the viewpoint of suppressing change in reflectance after molding, it is preferable that all the two or more cholesteric liquid crystal layers are a layer formed by curing a liquid crystal composition which includes, with respect to the total solid content of the liquid crystal composition, 25% by mass or more of the cholesteric liquid crystal compound having one ethylenically unsaturated group or one cyclic ether group.

In addition, for example, in a case where the decorative film according to one embodiment of the present disclosure has two cholesteric liquid crystal layers, from the viewpoint of suppressing change in reflectance after molding, it is preferable to have the cholesteric liquid crystal layer on each surface of the above-described base material.

<<Selective Reflectivity of Optical Reflective Layer>>

The optical reflective layer preferably has a central wavelength of a selective reflection wavelength in a range of 300 nm or more and 1,500 nm or less. In the present disclosure, the "central wavelength of the selective reflection wavelength" refers to, in a case where the minimum value and the local minimum value of light transmittance in a target object (for example, the optical reflective layer) are defined as $T_{min}$ (unit: %), an average value of two wavelengths showing half-value transmittance $T_{1/2}$ (unit: %) represented by the following expression. However, a first wavelength of the two wavelengths is the maximum wavelength in a wavelength range including a wavelength shorter than the wavelength indicating $T_{min}$, and a second wavelength of the two wavelengths in the minimum wavelength in the wavelength range including a wavelength longer than the wavelength indicating $T_{min}$. The transmittance is measured by a spectrophotometer (for example, spectrophotometer UV-2100 μmanufactured by Shimadzu Corporation). The central wavelength of the selective reflection wavelength may be included in a range of 380 nm or more and 780 nm or less, or in a range of more than 780 nm and 1,500 nm or less.

$T_{1/2}=100-(100-T_{min})/2$     Expression for calculating half-value transmittance The optical reflective layer preferably has a maximal reflection wavelength in a wavelength range of 380 nm to 1,500 nm. From the viewpoint of use for the decorative film, the wavelength range including the maximal reflection wavelength is preferably 380 nm to 1,200 nm, more preferably 400 nm to 1,000 nm, and particularly preferably 420 nm to 900 nm.

In the decorative film according to one embodiment of the present disclosure, two or more optical reflective layers are laminated, and in a certain aspect, diffuse reflectivities of the optical reflective layers are different from each other. The diffuse reflectivity is a diffuse reflectance which is defined by the following relational expression using an absolute reflectance (Rs) measured from a direction (0°) perpendicular to the film plane and an integral reflectance (Rd).

$(Rd-Rs)/Rd$     Expression for obtaining diffuse reflectance

For example, the measurement can be performed using a spectrophotometer V-670 manufactured by JASCO Corporation.

As a unit for controlling the diffuse reflectivity of the optical reflective layer, it is conceivable to have an uneven structure of the optical reflective layer, and the like. In addition, in a case where the optical reflective layer is a cholesteric liquid crystal, a method of controlling anisotropy of the alignment film to control an alignment degree of the liquid crystal is conceivable.

As the decorative film according to one embodiment of the present disclosure, a decorative film exhibiting a highly chroma saturated reflected tint is obtained. In order to achieve high chroma saturation, the optical reflective layer preferably has a maximal reflection wavelength in a wavelength range of 420 nm to 780 nm. The chroma saturation (C*ab) of the reflected tint of each layer can be uniquely calculated from a reflection spectrum. For example, using an integrated reflection spectrum measured with a spectrophotometer V-670 μmanufactured by JASCO Corporation, the chroma saturation can be calculated with a color diagnosis software (color evaluation (color diagnosis) program) equipped to the device. In this case, the display is performed in a CIE1976 L*a*b* color space based on XYZ color system calculated according to JIS Z 8701:1999 with a light source of D65 and a visual field of 2°.

A thickness of the optical reflective layer per layer is not particularly limited, and may be, for example, 0.5 μm to 10.0 μm or 1.0 μm to 8.0 μm. In a case of being 0.5 μm or more, good visibility of decoration is easily obtained, and in a case of being 10.0 μm or less, defects and distortions of the reflective film are suppressed, and a uniform reflected color is easily obtained.

<Alignment Layer>

The decorative film according to one embodiment of the present disclosure may include an alignment layer which is in contact with the cholesteric liquid crystal layer. The alignment layer is used for aligning the molecules of the liquid crystal compound in the liquid crystal composition in a case of forming a layer including the liquid crystal compound (hereinafter, also referred to as a "liquid crystal layer"). For example, since the alignment layer is used in the case of forming the liquid crystal layer, in a decorative film which does not include the liquid crystal layer, the alignment layer may or may not be included.

For example, the alignment layer can be provided by a rubbing treatment of an organic compound (preferably a polymer), an oblique vapor deposition of an inorganic compound (for example, $SiO_2$), or a formation of a layer having a microgroove. Furthermore, an alignment layer in which an alignment function occurs by application of an electric field, application of a magnetic field, or light irradiation has also been known. Depending on a material of the underlayer such as the support and the liquid crystal layer, the alignment layer may not be provided and the underlayer may be subjected to a direct alignment treatment (for example, rubbing treatment) to function as an alignment layer. Polyethylene terephthalate (PET) can be mentioned as an example of such a support as the underlayer. In addition, in a case where a layer (hereinafter, referred to as an "upper layer" in this paragraph) is directly laminated on the liquid crystal layer, in some cases, the liquid crystal layer as the underlayer behaves as the alignment layer and the liquid crystal compound for forming the upper layer can be aligned. In such a case, the liquid crystal compound in the upper layer can be aligned without providing the alignment layer or performing a special alignment treatment (for example, rubbing treatment).

Hereinafter, as a preferred example of the alignment layer, a rubbing-treated alignment layer and a photoalignment layer will be described.

<<Rubbing-Treated Alignment Layer>>

The rubbing-treated alignment layer is an alignment layer to which aligning properties are imparted by a rubbing treatment. Examples of a polymer which can be used in the rubbing-treated alignment layer include a methacrylate-based copolymer, a styrene-based copolymer, polyolefin, polyvinyl alcohol and modified polyvinyl alcohol, poly(N-methylol acrylamide), polyester, polyimide, a vinyl acetate copolymer, carboxymethyl cellulose, and polycarbonate, which are described in paragraph 0022 of JP1996-338913A (JP-H8-338913A). A silane coupling agent can be used as the polymer. As the polymer which can be used in the rubbing-treated alignment layer, a water-soluble polymer (for example, poly(N-methylol acrylamide), carboxymethyl cellulose, gelatin, polyvinyl alcohol, and modified polyvinyl alcohol) is preferable, gelatin, polyvinyl alcohol, or modified polyvinyl alcohol is more preferable, and polyvinyl alcohol or modified polyvinyl alcohol is particularly preferable.

In a method of aligning the liquid crystal compound using the rubbing-treated alignment layer, for example, the molecules of the liquid crystal compound are aligned by coating a rubbing-treated surface of the rubbing-treated alignment layer with a composition for forming a cholesteric liquid crystal layer (one aspect of the liquid crystal composition). Thereafter, as necessary, by reacting the polymer included in the alignment layer with a polyfunctional monomer included in the cholesteric liquid crystal layer, or by crosslinking polymer included in the alignment layer using a crosslinking agent, the cholesteric liquid crystal layer can be formed. A film thickness of the alignment layer is preferably in a range of 0.1 μm to 10 μm.

—Rubbing Treatment—

The surface of the alignment layer, the support, or other layers, to be coated with the composition for forming a cholesteric liquid crystal layer, may be subjected to a rubbing treatment as necessary. The rubbing treatment can be generally performed by rubbing a surface of a film containing a polymer as a main component with paper or cloth in a certain direction. The general method of the rubbing treatment is described in, for example, "Handbook of Liquid crystals" (published by Maruzen, Oct. 30, 2000).

As a method of changing a rubbing density, the method described in "Handbook of Liquid crystals" (published by Maruzen) can be used. The rubbing density (L) is quantified by Expression (A).

$$L=Nl(1+2\pi rn/60v) \quad \text{Expression (A)}$$

In Expression (A), N is the number of times of rubbing, l is a contact length of a rubbing roller, π is a circumference ratio, r is a radius of the roller, n is a rotation speed (rpm) of the roller, and v is a stage moving speed (speed per second).

In order to increase the rubbing density, it is sufficient that the number of times of rubbing is increased, the contact length of the rubbing roller is increased, the radius of the roller is increased, the rotation speed of the roller is increased, or the stage moving speed is decreased. On the other hand, in order to decrease the rubbing density, it is sufficient that the reverse is carried out. In addition, with regard to conditions for the rubbing treatment, the description in JP4052558B can be referred to.

<<Photoalignment Layer>>

The photoalignment layer is an alignment layer to which aligning properties are imparted by light irradiation. A photo-alignment material used for the photoalignment layer is described in many references. Preferred examples of the photo-alignment material include azo compounds described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B; aromatic ester compounds described in JP2002-229039A; maleimide and/or alkenyl-substituted nadiimide compounds having a photo alignment unit, described in JP2002-265541A and JP2002-317013A; photo-crosslinkable silane derivatives described in JP4205195B and JP4205198B; and photo-crosslinkable polyimides, polyamides, or esters described in JP2003-520878A, JP2004-529220A, and JP4162850B. Azo compounds or photo-crosslinkable polyimides, polyamides, or esters are particularly preferable.

For example, the photoalignment layer is manufactured by subjecting a layer formed of the above-described material to an irradiation of linearly polarized light or non-polarized light. In the present disclosure, the "irradiation of linearly polarized light" is an operation for causing a photo-reaction of the photo-alignment material. The wavelength of the light used depends on the photo-alignment material used, and is not particularly limited as long as a wavelength is necessary for the photo-reaction. The peak wavelength of the light used for light irradiation is preferably 200 nm to 700 nm and the light is more preferably ultraviolet light having a peak wavelength of 400 nm or less.

Examples of a light source used for light irradiation include commonly used light sources, for example, lamps (for example, a tungsten lamp, a halogen lamp, a xenon lamp, a xenon flash lamp, a mercury lamp, a mercury-xenon lamp, and a carbon arc lamp), various lasers (for example, semiconductor laser, helium neon laser, argon ion laser, helium cadmium laser, and yttrium aluminum garnet (YAG) laser), light emitting diodes, and cathode ray tube.

As a method for obtaining the linearly polarized light, a method of using a polarizing plate (for example, iodine polarizing plate, dichroic coloring agent polarizing plate, and wire grid polarizing plate), a method of using a prismatic element (for example, Glan-Thompson prism) and a reflective type polarizer using Brewster's angle, or a method of using light emitted from a polarized laser light source can be adopted. In addition, by using a filter and a wavelength conversion element, only light having a required wavelength may be irradiated selectively.

In a case where the irradiated light is the linearly polarized light, a method of irradiating light perpendicularly or obliquely to the upper surface or the lower surface of the alignment layer is adopted. The incidence angle of the light varies depending on the photo-alignment material, but is preferably 0° to 90° (perpendicular) and more preferably 40° to 90°. In a case where non-polarized light is used, the non-polarized light is obliquely irradiated to the upper surface or the lower surface of the alignment layer. The incidence angle of the non-polarized light is preferably 10° to 80°, more preferably 20° to 60°, and particularly preferably 30° to 50°. The irradiation time is preferably 1 μminute to 60 μminutes and more preferably 1 μminute to 10 minutes.

<Resin Layer>

The decorative film according to one embodiment of the present disclosure preferably includes a resin layer between the base material and the optical reflective layer. For example, in a case where a pressure is applied to the optical reflective layer to impart an uneven structure, by deforming the resin layer, it is easier for the optical reflective layer to follow unevenness used as a mold.

A thickness of the resin layer is preferably 0.2 μm to 100 μm, more preferably 0.5 μm to 70 μm, and still more preferably 1.0 μm to 50 μm.

An elastic modulus of the resin layer at 25° C. is preferably 0.000001 GPa to 3 GPa, more preferably 0.0001 to 1 GPa, and still more preferably 0.00001 to 0.5 GPa. The elastic modulus is measured by a nanoindenter device (for example, Nano Indenter G200, manufactured by KLA Corporation).

The resin layer preferably includes a binder resin as a main component. The binder resin is not limited, and a known resin can be applied. From the viewpoint of obtaining a desired color, as the binder resin, a transparent resin is preferable, and specifically, a resin having a total light transmittance of 80% or more is preferable. The total light transmittance can be measured by a spectrophotometer (for example, spectrophotometer UV-2100 μmanufactured by Shimadzu Corporation).

The binder resin is not limited, and a known resin can be applied. Examples of the binder resin include acrylic resins, silicone resins, polyester, urethane resins, and polyolefin. The binder resin may be a homopolymer of a specific monomer or a copolymer of the specific monomer and another monomer.

The binder resin may be used alone or in combination of two or more kinds thereof. From the viewpoint of molding processability, a content of the binder resin in the resin layer is preferably 5% by mass to 70% by mass, more preferably 10% by mass to 60% by mass, and particularly preferably 20% by mass to 60% by mass with respect to the total mass of the resin layer.

A known pressure sensitive adhesive or adhesive can also be used as the resin layer.

<<Pressure Sensitive Adhesive>>

Examples of the pressure sensitive adhesive include an acrylic pressure sensitive adhesive, a rubber-based pressure sensitive adhesive, and a silicone-based pressure sensitive adhesive. In addition, examples of the pressure sensitive adhesive include acrylic pressure sensitive adhesives, ultraviolet (UV) curable pressure sensitive adhesives, and silicone-based pressure sensitive adhesives described in "Chapters 2 of "Characterization evaluation of release paper, release film, and adhesive tape, and control technique thereof", 2004, Information Mechanism". The acrylic pressure sensitive adhesive in the present disclosure refers to a pressure sensitive adhesive including a polymer (that is, a (meth)acrylic polymer) of a (meth)acrylic monomer. In a case where the resin layer contains a pressure sensitive adhesive, the resin layer may further contain a viscosity imparting agent.

<<Adhesive>>

Examples of the adhesive include a urethane resin adhesive, a polyester adhesive, an acrylic resin adhesive, an ethylene vinyl acetate resin adhesive, a polyvinyl alcohol adhesive, a polyamide adhesive, and a silicone adhesive. From the viewpoint of higher adhesive force, a urethane resin adhesive or a silicone adhesive is preferable.

<<Method for Forming Resin Layer>>

A method for forming the resin layer is not limited. The resin layer can be formed, for example, by using a composition for forming the resin layer. The composition for forming the resin layer can be prepared, for example, by mixing raw materials of the resin layer. As a method for applying the composition for forming the resin layer, for example, the same method as the method for applying the liquid crystal composition can be used.

<<Additive>>

The resin layer may contain additives as necessary, in addition to the above-described components. The additive is not limited, and a known additive can be applied. Examples of the additive include surfactants described in paragraph 0017 of JP4502784B and paragraphs 0060 to 0071 of JP2009-237362A, thermal polymerization inhibitor described in paragraph 0018 of JP4502784B (also referred to as a polymerization inhibitor; preferred examples thereof include phenothiazine), and other additives described in paragraphs 0058 to 0071 of JP2000-310706.

<Printing Layer>

In the decorative film according to one embodiment of the present disclosure, two or more optical reflective layers are laminated, and the printing layer is laminated between the reflective optical reflective layers. The printing layer is a layer on which an image pattern is printed, the printing can be performed using a UV inkjet printer, for example, Acuity (registered trademark) 1600 and the like manufactured by FUJIFILM Corporation.

<Colored Layer>

The decorative film according to one embodiment of the present disclosure preferably includes a colored layer. In addition, in a certain embodiment, the decorative film is preferably a decorative film for viewing the colored layer through the cholesteric liquid crystal layer. The colored layer may be a colored (that is, not colorless and transparent) layer. The colored layer is preferably an opaque colored layer (preferably, a colored layer having a total light transmittance of 10% or less). In addition, the color of the colored layer may be black, gray, white, red, orange, yellow, green, blue, or violet. A black-colored layer is preferable from the viewpoint that the intensity of the reflected light is low and the change in color is more emphasized.

In addition, the colored layer may be a layer formed by curing a polymerizable compound, or may be a layer including a polymerizable compound and a polymerization initiator. From the viewpoint of storability and adhesiveness between the colored layer and other layers, the colored layer is preferably a layer formed by curing a polymerizable compound and more preferably a layer formed by curing at least a bifunctional or trifunctional polymerizable compound which has at least one partial structure selected from the group consisting of a urethane bond and an alkyleneoxy group having 2 or 3 carbon atoms.

<<Colorant>>

The colored layer preferably includes a colorant from the viewpoint of visibility, and more preferably includes a pigment as a colorant from the viewpoint of durability. The colorant is not particularly limited, and a colorant having a target color tone can be appropriately selected and used. Examples of the colorant include a pigment and a dye, and a pigment is preferable. In addition, the pigment is preferably a pigment having a particle shape. As the pigment, various inorganic pigments or organic pigments known in the related art can be used.

Examples of the inorganic pigment include inorganic pigments described in paragraph 0015 and paragraph 0114 of JP2005-7765A. Specific examples of the inorganic pigment include white pigments (for example, titanium dioxide, zinc oxide, lithopone, light calcium carbonate, white carbon, aluminum oxide, aluminum hydroxide, and barium sulfate) and black pigments (for example, carbon black, titanium black, titanium carbon, iron oxide, and graphite). For example, known chromatic pigments such as iron oxide, barium yellow, cadmium red, and chrome yellow can also be used.

Examples of the organic pigment include organic pigments described in paragraph 0093 of JP2009-256572A. Specific examples of the organic pigment include red pigments such as C. I. Pigment Red 177, 179, 224, 242, 254, 255, and 264, yellow pigments such as C. I. Pigment Yellow 138, 139, 150, 180, and 185, orange pigments such as C. I. Pigment Orange 36, 38, and 71, green pigments such as C. I. Pigment Green 7, 36, and 58, blue pigments such as C. I. Pigment Blue 15:6, and violet pigments such as C. I. Pigment Violet 23.

In addition, as the pigment, the colored layer may include particles of a pigment (so-called bright pigment) having a light-transmitting property and light-reflecting property. In a case where a method for forming the colored layer includes a step of exposing the colored layer, the bright pigment is preferably used in a range that does not hinder the curing by exposure.

The colorant may be used singly, or two or more kinds thereof may be used in combination. In addition, particles of the inorganic pigment and particles of the organic pigment may be used in combination. From the viewpoint of developing the target color tone (for example, suppressing whitening) and maintaining shape-following property of the colored layer to the mold, a content of the colorant in the colored layer is preferably 1% by mass to 50% by mass, more preferably 5% by mass to 50% by mass, and still more preferably 10% by mass to 40% by mass with respect to the total mass of the colored layer. Here, the "whitening" in the present disclosure means that the colored layer changes so as to exhibit a whitish tint with a matt tone.

<<Polymerizable Compound>>

The colored layer used in the present disclosure may include a polymerizable compound. The polymerizable compound is a compound having a polymerizable group.

Examples of a polymerizable group include an ethylenically unsaturated group and an epoxy group, and from the viewpoint of curing properties, an ethylenically unsaturated group is preferable and a (meth)acryloxy group is more preferable. In addition, as the polymerizable group, a radically polymerizable group is preferable.

As the polymerizable compound, a bifunctional or trifunctional polymerizable compound (hereinafter, also referred to as a "specific polymerizable compound") having at least one partial structure selected from the group consisting of a urethane bond, a urea bond, an alkyleneoxy group having 2 or 3 carbon atoms, and a hydrocarbon group having 6 to 12 carbon atoms is preferable, and a compound including a urethane bond in the partial structure is more preferable.

—Bifunctional or Trifunctional Polymerizable Compound Having Urethane Bond—

As the bifunctional or trifunctional polymerizable compound (hereinafter, also referred to as a "specific polymerizable compound 1") having a urethane bond, a urethane oligomer is preferable. A nitrogen atom in the urethane bond may be two-substituted (one of the groups on the nitrogen atom is a hydrogen atom) or three-substituted. In addition, the specific polymerizable compound 1 preferably has a urethane resin chain.

As the urethane oligomer, urethane (meth)acrylate oligomer is preferable. Examples of the urethane (meth)acrylate oligomer include an aliphatic urethane (meth)acrylate and an aromatic urethane (meth)acrylate. For details, the reference can be made to Oligomer Handbook (edited by Junji Furukawa, The Chemical Daily Co., Ltd.), and the urethane oligomer described therein can be appropriately selected according to the purpose and used for forming the colored layer.

A molecular weight of the urethane oligomer which is one of the specific polymerizable compounds 1 is preferably 800 to 2,000 and more preferably 1,000 to 2,000.

As the urethane (meth)acrylate oligomer which is one of the specific polymerizable compounds 1, a commercially available product may be used. Examples of the commercially available product of the urethane (meth)acrylate oligomer include U-2PPA and UA-122P manufactured by Shin-Nakamura Chemical Co., Ltd.; CN964A85, CN964, CN959, CN962, CN963J85, CN965, CN982B88, CN981, CN983, CN991, CN991NS, CN996, CN996NS, CN9002, CN9007, CN9178, and CN9893 μmanufactured by Sartomer Japan Inc.; and EBECRYL230, EBECRYL270, EBECRYL284, EBECRYL4858, EBECRYL210, EBECRYL8402, EBECRYL8804, and EBECRYL8800-20R manufactured by DAICEL-ALLNEX LTD. (above, product name). Note that, "EBECRYL" is a registered trademark.

<<Dispersant>>

From the viewpoint of improving dispersibility of the pigment included in the colored layer, the colored layer may contain a dispersant. In a case where the colored layer contains a dispersant, dispersibility of the pigment in the formed colored layer is improved, and the color tone of the decorative film to be obtained can be uniformized.

The dispersant can be appropriately selected and used according to the type and shape of the pigment, but is preferably a polymer dispersant. Examples of the polymer dispersant include silicone polymers, acrylic polymers, and polyester polymers.

In a case where it is desired to impart heat resistance to the decorative film, silicone polymers such as a graft type silicone polymer are suitably used as the dispersant.

A weight-average molecular weight of the dispersant is preferably 1,000 to 5,000,000, more preferably 2,000 to 3,000,000, and particularly preferably 2,500 to 3,000,000. In a case where the weight-average molecular weight is 1,000 or more, dispersibility of the pigment is further improved.

As the dispersant, a commercially available product may be used. Examples of the commercially available product include EFKA 4300 (acrylic polymer dispersant) manufactured by BASF Japan, HOMOGENOL L-18, HOMOGENOL L-95, and HOMOGENOL L-100 manufactured by Kao Corporation, Solsperse 20000 and Solsperse 24000 μmanufactured by Lubrizol Corporation, and DISPERBYK-110, DISPERBYK-164, DISPERBYK-180, and DISPERBYK-182 μmanufactured by BYK Chemie Japan. "HOMOGENOL", "Solsperse", and "DISPERBYK" are all registered trademarks.

In a case where the colored layer contains the dispersant, the colored layer may contain only one kind of dispersant or two or more kinds of dispersants. The content of the dispersant is preferably 1 part by mass to 30 parts by mass with respect to 100 parts by mass of the colorant.

<<Polymerization Initiator>>

The colored layer may include a polymerization initiator. From the viewpoint of increasing sensitivity to exposure, the polymerization initiator is preferably a photopolymerization initiator. As the photopolymerization initiator, for example, polymerization initiators described in paragraphs 0031 to 0042 of JP2011-95716A and oxime-based polymerization initiators described in paragraphs 0064 to 0081 of JP2015-014783A can be used.

Specific examples of the photopolymerization initiator include 1-[4-(phenylthio)phenyl]-1,2-octanedione-2-(O-benzoyloxime) (for example, IRGACURE (registered trademark) OXE-01 μmanufactured by BASF), [9-ethyl-6-(2-methylbenzoyl)-9H-carbazol-3-yl]ethan-1-one-1-(O-acetyloxime) (for example, IRGACURE (registered trademark) OXE-02 μmanufactured by BASF), 2-(dimethylamino)-2-[(4-methylphenyl)methyl]-1-[4-(4-morpholinyl)phenyl]-1-butanone (for example, IRGACURE (registered trademark) 379EG manufactured by BASF), 2-methyl-1-(4-methylthiophenyl)-2-morpholinopropan-1-one (for example, IRGACURE (registered trademark) 907 μmanufactured by BASF), 2-hydroxy-1-{4-[4-(2-hydroxy-2-methylpropionyl)benzyl]phenyl}-2-methyl-propan-1-one (for example, IRGACURE (registered trademark) 127 μmanufactured by BASF), 2-benzyl-2-dimethylamino-1-(4-morpholinophenyl)butanone-1 (for example, IRGACURE (registered trademark) 369 manufactured by BASF), 2-hydroxy-2-methyl-1-phenylpropan-1-one (for example, IRGACURE (registered trademark) 1173 μmanufactured by BASF), 1-hydroxycyclohexyl phenyl ketone (for example, IRGACURE (registered trademark) 184 μmanufactured by BASF), 2,2-dimethoxy-1,2-diphenylethan-1-one (for example, IRGACURE (registered trademark) 651 manufactured by BASF), product name: Lunar 6 which is an oxime ester-based polymerization initiator (manufactured by DKSH Japan), 2,4-diethylthioxanthone (for example, KAYACURE DETX-S manufactured by Nippon Kayaku Co., Ltd.), and DFI-091 and DFI-020 which are fluorene oxime-based polymerization initiator (both manufactured by DAITO CHEMIX Co., Ltd.).

Among these, from the viewpoint of increasing curing sensitivity, an initiator other than a halogen-containing polymerization initiator, such as a trichloromethyltriazine-based compound, is preferably used, and oxime-based polymerization initiators such as an α-aminoalkylphenone-based compound, an α-hydroxyalkylphenone-based compound, and an oxime ester-based compound are more preferable.

The content of the polymerization initiator is preferably 0.1 parts by mass to 15 parts by mass and more preferably 0.5 parts by mass to 10 parts by mass with respect to 100 parts by mass of the polymerizable compound.

<<Binder Resin>>

From the viewpoint of reducing curing shrinkage of the colored layer, the colored layer preferably contains a binder resin. The binder resin is not particularly limited, and a known resin can be appropriately selected. From the viewpoint of obtaining a target color tone, as the binder resin, a transparent resin is preferable, and specifically, a resin having a total light transmittance of 80% or more is preferable. The total light transmittance can be measured by a spectrophotometer (for example, spectrophotometer UV-2100 μmanufactured by Shimadzu Corporation).

Examples of the binder resin include acrylic resins, silicone resins, polyester resins, urethane resins, and olefin resins. Among these, from the viewpoint of transparency, acrylic resins, silicone resins, or polyester resins are preferable, and acrylic resins or silicone resins are more preferable. Furthermore, from the viewpoint of heat resistance, silicone resins are preferable.

The "acrylic resin" in the present disclosure means a resin including a constitutional unit derived from an acrylic monomer having a (meth)acryloyl group. The (meth)acryloyl group is a concept including a methacryloyl group and an acryloyl group. The acrylic resin includes, for example, an acrylic acid homopolymer, a methacrylic acid homopolymer, an acrylic acid ester homopolymer, a methacrylic acid ester homopolymer, a copolymer of acrylic acid and other monomers, a copolymer of methacrylic acid and other monomers, a copolymer of acrylic acid ester and other monomers, a copolymer of methacrylic acid ester and other monomers, and a urethane-modified copolymer having a urethane skeleton in the side chain. Examples of the acrylic resin include a glycidyl methacrylate adduct of a cyclohexyl methacrylate/methyl methacrylate/methacrylic acid copolymer, a random copolymer of benzyl methacrylate/methacrylic acid, a copolymer of allyl methacrylate/methacrylic acid, and a copolymer of benzyl methacrylate/methacrylic acid/hydroxyethyl methacrylate.

As the silicone resin, a known silicone resin can be used, and examples thereof include methyl-based straight silicone resins, methylphenyl-based straight silicone resins, acrylic resin-modified silicone resins, ester resin-modified silicone resins, epoxy resin-modified silicone resins, and alkyd resin-modified silicone resins, and rubber-based silicone resins. Among these, methyl-based straight silicone resins, methylphenyl-based straight silicone resins, acrylic resin-modified silicone resins, or rubber-based silicone resins are preferable, and methyl-based straight silicone resins, methylphenyl-based straight silicone resins, or rubber-based silicone resins are more preferable.

As the silicone resin, a commercially available product may be used, and examples of the commercially available product include KR-300, KR-311, KR-251, X-40-2406M, and KR-282 μmanufactured by Shin-Etsu Chemical Co., Ltd.

Examples of the polyester resin include a linear saturated polyester synthesized from aromatic dibasic acid or an ester-forming derivative thereof, and diol or an ester-forming derivative thereof. Specific examples of the linear saturated polyester include polyethylene terephthalate, polyethylene isophthalate, polybutylene terephthalate, poly(1,4-cyclohexylene dimethylene terephthalate), and polyethylene-2,6-naphthalate.

From the viewpoint of reducing curing shrinkage of the colored layer, the content of the binder resin is preferably 5% by mass to 70% by mass, more preferably 10% by mass to 60% by mass, and still more preferably 20% by mass to 60% by mass with respect to the total mass of the colored layer. In addition, the ratio of the total amount of the binder resin to the total amount of the polymerizable compound including the specific polymerizable compound, that is, the total amount of the polymerizable compound/the total amount of the binder resin is preferably 0.3 to 1.5 and more preferably 0.5 to 1.0.

<<Other Components>>

The colored layer may contain additives as necessary, in addition to the above-described components. As the additive, a known additive can be used, and examples thereof include surfactants described in paragraph 0017 of JP4502784B and paragraphs 0060 to 0071 of JP2009-237362A, thermal polymerization inhibitor described in paragraph 0018 of JP4502784B (also referred to as a polymerization inhibitor; preferably, phenothiazine), and other additives described in paragraphs 0058 to 0071 of JP2000-310706.

<<Formation of Colored Layer>>

The method for forming the colored layer is not particularly limited, but it is preferable that the colored layer is formed using a composition for forming the colored layer. The composition for forming the colored layer preferably contains the colorant, and more preferably contains the colorant and an organic solvent. In addition, the composition for forming the colored layer may further contain the above-described other components. The composition for forming the colored layer can be prepared, for example, by mixing an organic solvent, and components contained in the colored layer, such as the colorant. The content of the components contained in the colored layer is described as the content (% by mass) with respect to the total mass of the colored layer, but in a case where these components are contained in the composition for forming the colored layer, the content thereof may be considered as the content (% by mass) with respect to the total solid content of the composition for forming the colored layer.

In addition, in a case where the composition for forming the colored layer contains a pigment as the colorant, from the viewpoint of enhancing uniform dispersibility and dispersion stability of the pigment, it is preferable that a pigment dispersion liquid containing the pigment and a dispersant thereof is prepared in advance and the composition for forming the colored layer is prepared using the pigment dispersion liquid.

As the composition for forming the colored layer, a composition prepared in advance by the above-described method may be used, a commercially available product or the like may be used, or a composition for forming the colored layer may be prepared immediately before coating.

—Organic Solvent—

As the organic solvent, a generally used organic solvent can be used without particular limitation. Specific examples thereof include organic solvents such as esters, ethers, ketones, and aromatic hydrocarbons. In addition, as the organic solvent in the composition for forming the colored layer, methyl ethyl ketone, propylene glycol monomethyl ether, propylene glycol monomethyl ether acetate, cyclohexanone, cyclohexanol, methyl isobutyl ketone, ethyl lactate, methyl lactate, and the like, which are the same as Solvent described in paragraphs 0054 and 0055 of US2005/282073A, can also be suitably used. Among these, as the organic solvent in the composition for forming the colored layer, 1-methoxy-2-propyl acetate, methyl 3-ethoxypropionate, ethyl 3-ethoxypropionate, ethyl cellosolve acetate, ethyl lactate, butyl acetate, methyl 3-methoxypropionate, 2-heptanone, cyclohexanone, diethylene glycol monoethyl ether acetate (ethyl carbitol acetate), diethylene glycol monobutyl ether acetate (butyl carbitol acetate), propylene glycol methyl ether acetate, methyl ethyl ketone, and the like are preferably used. These organic solvents may be used singly, or two or more kinds thereof may be used in combination. In addition, the content of the organic solvent is not particularly limited, but is preferably 5% by mass to 90% by mass and more preferably 30% by mass to 70% by mass with respect to the total mass of the composition for forming the colored layer (for example, a coating liquid).

<Adhesive Layer>

From the viewpoint of adhesiveness to the housing to which the decorative film is attached, or adhesiveness between layers, the decorative film according to one embodiment of the present disclosure preferably includes an adhesive layer. A material of the adhesive layer is not particularly limited and can be appropriately selected depending on the purpose. Examples of the adhesive layer include a layer including a known pressure sensitive adhesive or adhesive.

<<Pressure Sensitive Adhesive>>

Examples of the pressure sensitive adhesive include an acrylic pressure sensitive adhesive, a rubber-based pressure sensitive adhesive, and a silicone-based pressure sensitive adhesive. In addition, examples of the pressure sensitive adhesive include acrylic pressure sensitive adhesives, ultraviolet (UV) curable pressure sensitive adhesives, and silicone-based pressure sensitive adhesives described in Chapters 2 of "Characterization evaluation of release paper, release film, and adhesive tape, and control technique thereof", 2004, Information Mechanism. In a case where the adhesive layer contains a pressure sensitive adhesive, the adhesive layer may further contain a viscosity imparting agent.

<<Adhesive>>

Examples of the adhesive include a urethane resin adhesive, a polyester adhesive, an acrylic resin adhesive, an ethylene vinyl acetate resin adhesive, a polyvinyl alcohol adhesive, a polyamide adhesive, and a silicone adhesive. From the viewpoint of higher adhesive force, a urethane resin adhesive or a silicone adhesive is preferable.

In the decorative film according to a certain embodiment, it is preferable that a relationship between a thickness (T2) of the colored layer, a thickness (T3) of the optical reflective layer (preferably, the cholesteric liquid crystal layer), and a thickness (T4) of the adhesive layer satisfies T4<10(T2+T3). By satisfying the above-described relationship, it is possible to obtain a decorative film which is a thin film and has excellent lustrousness and visibility. T4<8(T2+T3) is more preferable, T4<5(T2+T3) is still more preferable, and T4<3 (T2+T3) is particularly preferable.

<<Method for Forming Adhesive Layer>>

A method for forming the adhesive layer is not particularly limited, and examples thereof include a method of laminating a protective film on which the adhesive layer has been formed so that the adhesive layer and an object (for example, the optical reflective layer, the alignment layer, or the colored layer) are in contact with each other, a method of laminating the adhesive layer alone so as to be in contact with an object (for example, the optical reflective layer, the alignment layer, or the colored layer), and a method of applying a composition including the pressure sensitive adhesive or the adhesive to an object (for example, the optical reflective layer, the alignment layer, or the colored layer). As a laminating method, a known method can be used. Preferred examples of an applying method include the same method as the applying method of the liquid crystal composition.

From the viewpoint of both pressure sensitive strength and handleability, a thickness of the adhesive layer in the decorative film is preferably 2 μm to 40 μm, more preferably 3 μm to m, still more preferably 4 μm to 20 μm, and particularly preferably 4 μm to 15 μm.

<Other Layers>

The decorative film according to one embodiment of the present disclosure may include other layers in addition to the above-described layers. Examples of the other layers include a self-repairing layer, an antistatic layer, an antifouling layer, an anti-electromagnetic wave layer, and a conductive layer, which are known as a layer for a decorative film. The other layers in the decorative film according to one embodiment of the present disclosure can be formed by known methods. Examples thereof include a method of applying a composition (composition for forming a layer) containing components included in these layers in a layered shape, and drying the composition.

<<Cover Film>>

For the purpose of preventing stains, and the like, the decorative film according to one embodiment of the present disclosure may include a cover film as an outermost layer on the optical reflective layer side based on the base material. The cover film is not particularly limited as long as the cover film is formed of a material having flexibility and good peelability, and examples thereof include resin films. Examples of the resin film include a polyethylene film. The cover film is introduced into the decorative film, for example, by attaching the cover film to an object (for example, the optical reflective layer). The method for attaching the cover film is not particularly limited, and examples thereof include a known attaching method, such as a method of laminating the cover film on the object (for example, the optical reflective layer).

<Layer Configuration of Decorative Film>

Examples of a layer configuration of the decorative film will be described with reference to FIGS. 1 and 2, respectively. However, the layer configuration of the decorative film is not limited to the layer configuration shown in each figure. FIG. 1 is a schematic cross-sectional view showing an example of layer configuration of the decorative film according to the embodiment of the present disclosure. A decorative film 20 shown in FIG. 1 includes a base material 22, a mirror layer (optical reflective layer) 24 on the base material 22, an alignment layer 26 on the mirror layer 24, a cholesteric liquid crystal layer (optical reflective layer) 28 on the alignment layer 26, and a pressure-sensitive adhesive layer 30 on the cholesteric liquid crystal layer 28.

Figure 2:
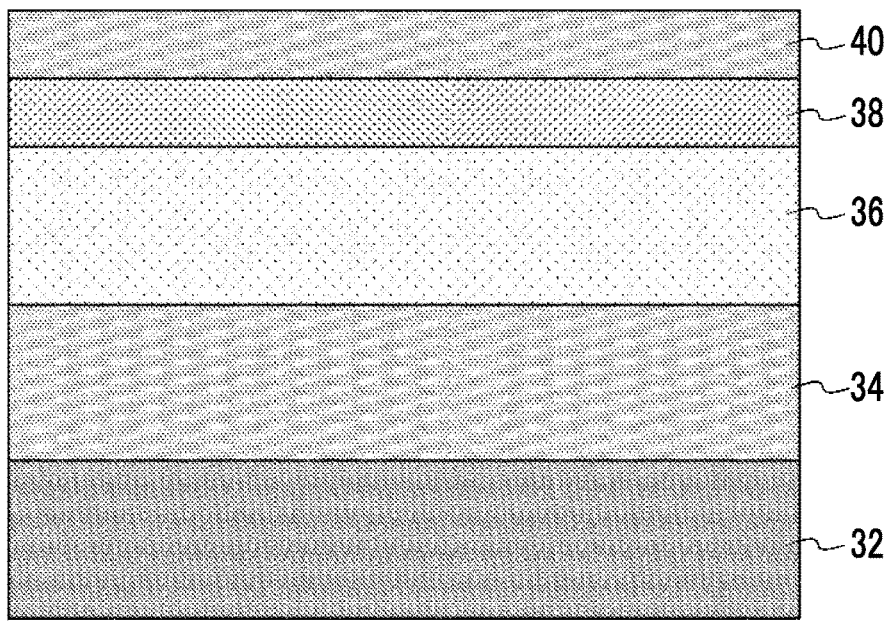
FIG. 2 is a schematic cross-sectional view showing an example of a decorative film according to an embodiment of the present disclosure.

FIG. 2 is a schematic cross-sectional view showing an example of layer configuration of the decorative film according to the embodiment of the present disclosure. A decorative film 50 shown in FIG. 2 includes a mirror layer (optical reflective layer) 32, a base material 34 on the mirror layer 32, a resin layer 36 on the base material 34, an alignment layer 38 on the resin layer 36, and a cholesteric liquid crystal layer (optical reflective layer) 40 on the alignment layer 38.

<Method for Manufacturing Decorative Film>

A method for manufacturing the decorative film according to one embodiment of the present disclosure is not limited. For example, by providing the optical reflective layer and a layer other than the optical reflective layer as necessary on the base material, a decorative film having at least the base material and two or more optical reflective layers can be manufactured. As a method for forming each layer, the above-described method can be used. It is also possible to manufacture a plurality of laminates including two or more layers in advance, and superimpose the plurality of laminates.

(Decoration Method and Decoration Product)

The decoration method according to one embodiment of the present disclosure is not particularly limited as long as a decoration method using the decorative film according to one embodiment of the present disclosure. It is preferable that the decoration method according to one embodiment of the present disclosure includes, for example, a step of attaching a surface of the decorative film on the optical reflective layer side and a convex surface of a transparent body by a laminating or molding processing process. The decoration product according to one embodiment of the present disclosure is a decoration product using the decorative film according to one embodiment of the present disclosure, and is preferably a decoration product obtained by the decoration method according to one embodiment of the present disclosure.

(Decorative Molded Article)

The decorative molded article according to one embodiment of the present disclosure includes the decorative film according to one embodiment of the present disclosure. That is, the decorative molded article according to one embodiment of the present disclosure includes a base material and an optical reflective layer coloring by optical interference or structural color, in which at least two or more layers of the optical reflective layer are laminated, and diffuse reflectivities of the respective optical reflective layers are different from each other, or a printing layer is laminated between the respective optical reflective layers.

<Base Material>

The decorative molded article according to one embodiment of the present disclosure includes a base material. As the base material, for example, the base material described in the section of "Decorative film" above can be used. Preferred aspects of the base material are the same as the preferred aspects of the base material described in the section of "Decorative film" above. The base material may have an uneven structure.

<Optical Reflective Layer>

The decorative molded article according to one embodiment of the present disclosure includes at least two optical reflective layers. As the optical reflective layer, the optical reflective layer described in the section of "Decorative film" above can be used. Preferred aspects of the optical reflective layer are the same as the preferred aspects of the optical reflective layer described in the section of "Decorative film" above. In a certain embodiment, the optical reflective layer is preferably a layer which includes a cholesteric liquid crystal.

<Resin Layer>

The decorative molded article according to one embodiment of the present disclosure preferably includes a resin layer between the base material and the optical reflective layer. The resin layer particularly contributes to a formation of a linear convex structure in the optical reflective layer. For example, with the resin layer, it is possible to improve followability of the optical reflective layer to the surface having the linear convex structure (that is, the linear convex surface) used as a mold for imparting the linear convex structure to the optical reflective layer. As a result, a desired linear convex structure can be easily imparted to the optical reflective layer.

As the resin layer, the resin layer described in the section of "Decorative film" above can be used. Preferred aspects of the resin layer are the same as the preferred aspects of the resin layer described in the section of "Decorative film" above. The resin layer may have a linear convex structure. The resin layer preferably has the same convex structure as that of the optical reflective layer.

A thickness of the resin layer is preferably 0.5 times to 10 times, more preferably 0.8 times to 8 times, and particularly preferably 1 time to 5 times with respect to a depth of the linear convex structure of the optical reflective layer.

<Colored Layer>

The decorative molded article according to one embodiment of the present disclosure preferably includes a colored layer. As the colored layer, the colored layer described in the section of "Decorative film" above can be used. Preferred aspects of the colored layer are the same as the preferred aspects of the colored layer described in the section of "Decorative film" above. The colored layer may have a linear convex structure.

A position of the colored layer is not limited. In a certain embodiment, the colored layer is preferably disposed between the base material and the optical reflective layer. That is, it is preferable that the decorative molded article according to a certain embodiment includes the base material, the colored layer, and the optical reflective layer in this order. In a certain embodiment, it is preferable that the colored layer is disposed on a side of the base material opposite to the optical reflective layer. That is, it is preferable that the decorative molded article according to a certain embodiment includes the colored layer, the base material, and the optical reflective layer in this order.

<Alignment Layer>

The decorative molded article according to one embodiment of the present disclosure may include an alignment layer. The alignment layer is preferably in contact with the optical reflective layer (preferably, the cholesteric liquid crystal layer). As the alignment layer, the alignment layer described in the section of "Decorative film" above can be used. Preferred aspects of the alignment layer are the same as the preferred aspects of the alignment layer described in the section of "Decorative film" above. The alignment layer may have a linear convex structure.

<Adhesive Layer>

The decorative molded article according to one embodiment of the present disclosure may include an adhesive layer. The adhesive layer may be disposed on the surface of the decorative molded article. The adhesive layer may be disposed between any two layers included in the decorative molded article. As the adhesive layer, the adhesive layer described in the section of "Decorative film" above can be used. Preferred aspects of the adhesive layer are the same as the preferred aspects of the adhesive layer described in the section of "Decorative film" above. The adhesive layer may have a linear convex structure.

<Other Layers>

The decorative molded article according to one embodiment of the present disclosure may include layers other than the above-described layers. As other layers, for example, the other layers described in the section of "Decorative film" above can be used.

In a certain embodiment, it is preferable that the decorative molded article according to one embodiment of the present disclosure includes the base material, the optical reflective layer, and a transparent body having a surface having an uneven structure in this order. For example, by observing the decorative molded article in a direction from the transparent body toward the base material, the user can observe a tint which has high lustrousness and varies depending on the viewing direction. The transparent body is preferably in contact with the optical reflective layer (preferably, the cholesteric liquid crystal layer). The transparent body may be in contact with the optical reflective layer through another layer (for example, the alignment layer). It is preferable that the convex surface of the transparent body faces the optical reflective layer. Examples of the transparent body include a transparent resin, glass, and a prism, and examples thereof include a transparent body shown in FIGS. 7 and 8.

<Layer Configuration of Decorative Molded Article>

Examples of layer configurations of the decorative molded article will be described with reference to FIGS. 3, 4, and 5, respectively. However, the layer configuration of the decorative molded article is not limited to the layer configuration shown in each figure.

Figure 3:
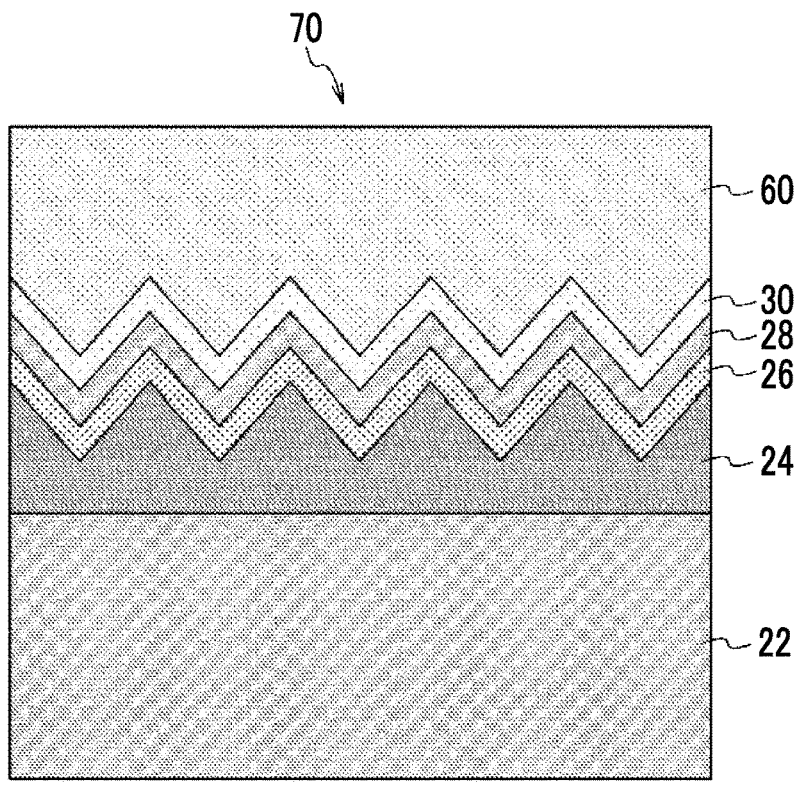
FIG. 3 is a schematic cross-sectional view showing an example of a decorative molded article according to an embodiment of the present disclosure.

FIG. 3 is a schematic cross-sectional view showing an example of the decorative molded article according to the embodiment of the present disclosure. A decorative molded article 70 shown in FIG. 3 includes a base material 22, a mirror layer (optical reflective layer) 24, an alignment layer 26, a cholesteric liquid crystal layer (optical reflective layer) 28, an adhesive layer 30, and a transparent body 60 having an uneven structure in this order. The transparent body 60 is an aspect of the transparent body.

Figure 4:
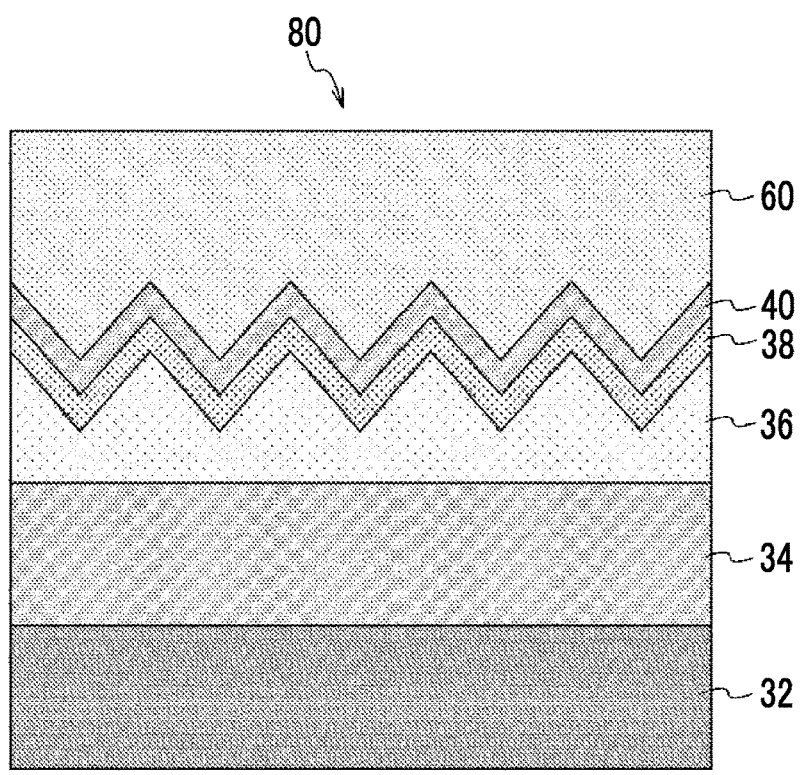
FIG. 4 is a schematic cross-sectional view showing an example of the decorative molded article according to the embodiment of the present disclosure.

FIG. 4 is a schematic cross-sectional view showing an example of the decorative molded article according to the embodiment of the present disclosure. A decorative molded article 80 shown in FIG. 4 includes a mirror layer (optical reflective layer) 32, a base material 34, a resin layer 36, an alignment layer 38, a cholesteric liquid crystal layer (optical reflective layer) 40, and a transparent body 60 having an uneven structure in this order.

Figure 5:
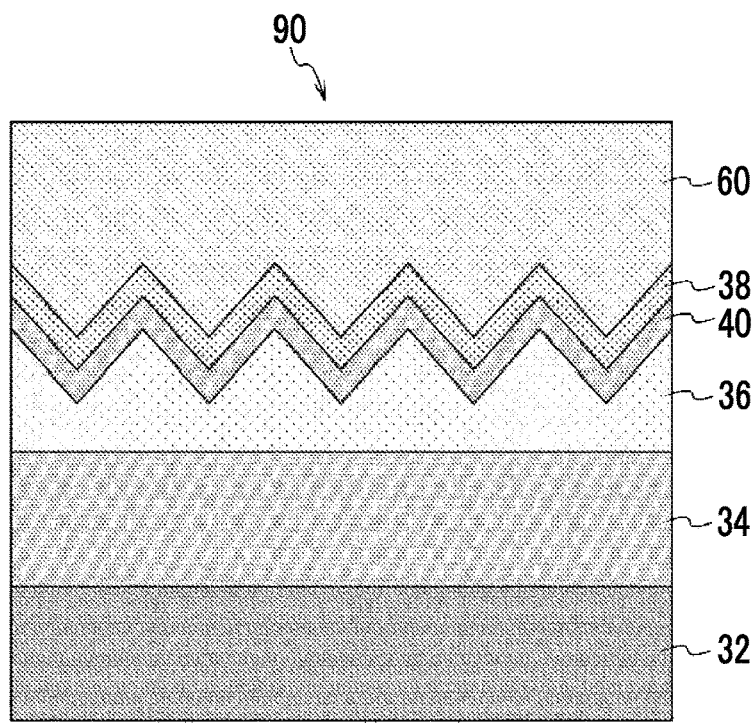
FIG. 5 is a schematic cross-sectional view showing an example of the decorative molded article according to the embodiment of the present disclosure.

FIG. 5 is a schematic cross-sectional view showing an example of the decorative molded article according to the embodiment of the present disclosure. A decorative molded article 90 shown in FIG. 5 includes a mirror layer (optical reflective layer) 32, a base material 34, a resin layer 36, a cholesteric liquid crystal layer (optical reflective layer) 40, an alignment layer 38, and a transparent body 60 having an uneven structure in this order.

<Method for Manufacturing Decorative Molded Article>

A method for manufacturing the decorative molded article according to one embodiment of the present disclosure is preferably a method using the decorative film according to one embodiment of the present disclosure. In the method for manufacturing the decorative molded article according to one embodiment of the present disclosure, a step of attaching the decorative film to the transparent body having an uneven structure on the optical reflective layer side is preferable. Since the decorative film according to one embodiment of the present disclosure has excellent three-dimensional moldability, the decorative film according to one embodiment of the present disclosure can be suitably used for manufacturing a decorative molded article, and for example, it is particularly suitable for manufacturing a decorative molded article by at least one molding selected from the group consisting of thermal lamination, three-dimensional molding, and insert molding. In addition, according to the decorative film according to one embodiment of the present disclosure, it is also possible to obtain a decorative molded article by attaching the decorative film according to one embodiment of the present disclosure to a molded article after molding. In a case of using the decorative film according to one embodiment of the present disclosure in a case of producing a decorative molded article, it can be applied to molds having more a complicated shape, smaller shape, and the like, which expands the range of applications of the decorative molded article. The layer configuration of the decorative molded article obtained by using the decorative film reflects the layer configuration of the decorative film. In other words, the decorative molded article obtained by using the decorative film includes each layer included in the decorative film.

In addition, suitable examples of the molding include three-dimensional molding. Suitable examples of the three-dimensional molding include heat molding, vacuum molding, pressure molding, and vacuum pressure molding. A method of performing the vacuum molding is not particularly limited, but is preferably a method of performing three-dimensional molding in a heated state under vacuum. The vacuum means a state in which an inside of a chamber is reduced to a degree of vacuum of 100 Pa or less. It is sufficient that the temperature in a case of performing the three-dimensional molding is appropriately set depending on the used base material for molding, but the temperature is preferably in a temperature range of 60° C. or higher, more preferably in a temperature range of 80° C. or higher, and still more preferably in a temperature range of 100° C. or higher. The upper limit of the temperature in a case of performing the three-dimensional molding is preferably 200° C. The temperature in a case of performing the three-dimensional molding means a temperature of the base material for molding supplied for the three-dimensional molding, and is measured by attaching a thermocouple to the surface of the base material for molding.

The vacuum molding can be performed using a vacuum molding technique widely known in the molding field, and for example, the vacuum molding may be performed using Formech 508FS manufactured by NIHON SEIZUKI KOGYO CO., LTD.

Hereinafter, the method for manufacturing the decorative molded article will be specifically described. It is preferable that the method for manufacturing the decorative molded article according to one embodiment of the present disclosure includes a step of preparing a decorative film having at least a base material and two or more optical reflective layers, and a step of bringing the optical reflective layer into contact with a surface having an uneven structure and applying a pressure of 0.01 Mpa or more to the optical reflective layer to impart the uneven structure to the optical reflective layer. The surface having an uneven structure functions as a mold for imparting the uneven structure to the optical reflective layer. By bringing the optical reflective layer into contact with the surface having an uneven structure and pressurizing the optical reflective layer, the optical reflective layer is deformed along the surface having the uneven structure. As a result, the uneven structure is imparted to the optical reflective layer.

The layer configuration of the decorative film may be determined according to the layer configuration of the desired decorative molded article. For example, by using a decorative film having a base material, an optical reflective layer, a resin layer between the base material and the optical reflective layer, and another optical reflective layer on a side of the base material opposite to the side having the resin layer, a decorative molded article including the base material, the resin layer, and the optical reflective layers in this order is obtained.

The surface having a linear convex structure is defined by an outer surface of various articles. The surface having an uneven structure may be, for example, a surface of a mold or a surface of an article other than the mold.

In the process of bringing the optical reflective layer into contact with the surface having a linear convex structure, the optical reflective layer may be brought close to the surface having an uneven structure, or the surface having a linear convex structure may be brought close to the optical reflective layer. The optical reflective layer may be brought into contact with the surface having a linear convex structure through another layer (for example, an alignment layer).

The pressure applied to the optical reflective layer is preferably 0.1 Mpa or more, more preferably 0.3 Mpa or more, and particularly preferably 0.5 Mpa or more. The upper limit of the pressure applied to the optical reflective layer is not limited. The upper limit of the pressure applied to the optical reflective layer may be determined, for example, in accordance with workability of the optical reflective layer and the thickness of the decorative film. The pressure applied to the optical reflective layer is preferably 10 Mpa or less, more preferably 3 Mpa or less, and particularly preferably 1 Mpa or less.

A method of applying the pressure to the optical reflective layer is not limited, and a known method can be used. Examples of the method of applying the pressure include a method using compressed air and a method using a pressing machine.

In the method for manufacturing the decorative molded article, as the article having the surface having an uneven structure, for example, a transparent body having the surface having an uneven structure (that is, an uneven surface) may be used. For example, in a method for manufacturing the decorative molded article according to a certain embodiment, it is preferable to include a step of preparing a decorative film having at least a base material and an optical reflective layer which has a central wavelength of a selective reflection wavelength in a range of 300 nm or more and 1,500 nm or less; and a step of bringing the optical reflective layer into contact with the surface having an uneven structure by superimposing the transparent body having the surface having an uneven structure and the decorative film, and then applying a pressure of 0.01 Mpa or more to the optical reflective layer to impart a linear convex structure to the optical reflective layer. After imparting the linear convex structure to the optical reflective layer, the transparent body may or may not be removed. In a case where the transparent body is not removed, the transparent body is disposed, for example, as an outer layer of the decorative molded article.

<Use>

The use of the decorative molded article obtained as described above is not particularly limited, and the decorative molded article can be used for various articles. Particularly suitable examples of the use of the decorative molded article include interiors and exteriors of electronic devices (for example, wearable devices and smartphones), interiors and exteriors of automobiles, interiors and exteriors of electric appliances, and packaging containers.

(Decorative Panel)

The decorative panel according to one embodiment of the present disclosure includes the decorative film according to one embodiment of the present disclosure. The decorative film in the decorative panel has the same meaning as the decorative film described in the section of "Decorative film" above.

The decorative panel can be manufactured, for example, by adhering a surface of the decorative molded article on the optical reflective layer side to a surface of a member serving as a surface layer portion of the decorative panel. Examples of the member serving as the surface layer portion of the decorative panel include a glass panel. For example, the above-described adhesive layer can be used for adhering the decorative molded article to the member serving as the surface layer portion of the decorative panel. The decorative molded article may be used alone as the decorative panel without combining the decorative molded article with other members.

Figure 6:
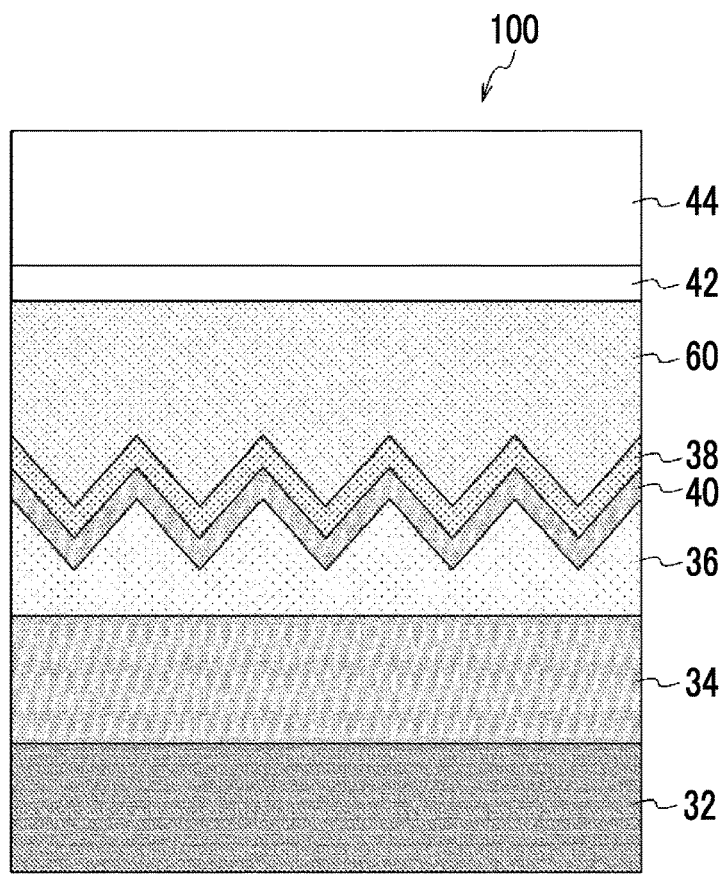
FIG. 6 is a schematic cross-sectional view showing an example of a decorative panel according to an embodiment of the present disclosure.

An example of a layer configuration of the decorative panel will be described with reference to FIG. 6. However, the layer configuration of the decorative panel is not limited to the layer configuration shown in FIG. 6. FIG. 6 is a schematic cross-sectional view showing an example of a decorative panel according to an embodiment of the present disclosure. A decorative panel 100 shown in FIG. 6 includes a mirror layer (optical reflective layer) 32, a base material 34, a resin layer 36, a cholesteric liquid crystal layer (optical reflective layer) 40, an alignment layer 38, a transparent body 60 having an uneven structure, an adhesive layer 42, and a glass panel 44 in this order.

A shape of the decorative panel is not limited. The shape of the decorative panel may be determined, for example, according to the use. The decorative panel may have, for example, a flat plate. In addition, the decorative panel may have a curved surface.

The decorative panel can be used, for example, for interiors and exteriors of various articles (for example, electronic devices, automobiles, and electric appliances). For example, in a case where the decorative panel 100 shown in FIG. 6 is used as a housing for an electronic device, it is preferable that the mirror layer 32, the base material 34, the resin layer 36, the cholesteric liquid crystal layer 40, the alignment layer 38, the transparent body 60 having an uneven structure, the adhesive layer 42, and the glass panel 44 are arranged from the inside to the outside of the housing. By observing the decorative panel 100 in a direction from the glass panel 44 toward the mirror layer 32, the user can observe a tint which has high lustrousness and varies depending on the viewing direction.

(Electronic Device)

The electronic device according to one embodiment of the present disclosure includes the decorative panel according to one embodiment of the present disclosure. Examples of the electronic device include a wearable device and a smartphone. The decorative panel in the electronic device has the same meaning as the decorative panel described in the section of "Decorative panel" above. The decorative panel is preferably used as a housing for an electronic device.

A method for manufacturing the electronic device is not limited, and a known method can be used. In a case where the decorative panel is used as a housing for an electronic device, an electronic device including the decorative panel can be manufactured by housing various electronic components of the electronic device inside the housing including the decorative panel.

EXAMPLES

Hereinafter, the present disclosure will be more specifically described with reference to Examples. The scope of the present disclosure is not limited to the specific examples shown below.

Example 1

<Preparation of Support>

As a support, two sheets of COSMOSHINE (registered trademark) A4100 (PET, thickness: 50 μm, film having an easy adhesion layer on one side, manufactured by Toyobo Co., Ltd., A4 size) were prepared. Hereinafter, the two supports will be referred to as a support 1A and a support 1B, respectively.

[Composition of Coating Liquid 1 for Forming Alignment Layer]

Modified polyvinyl alcohol shown below: 28 parts by mass

Citric acid ester (AS3, manufactured by SANKYO CHEMICAL Co., Ltd.): 1.2 parts by mass Photopolymerization initiator (IRGACURE 2959, manufactured by BASF): 0.84 parts by mass Glutaraldehyde: 2.8 parts by mass Water: 699 parts by mass Methanol: 226 parts by mass Modified polyvinyl alcohol (the following compounds; the numbers at the lower right of each constitutional unit represent the molar ratio)

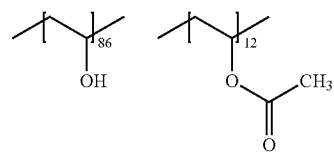

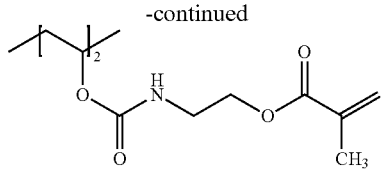

<Production of Laminate 1-1>

The coating liquid 1 for forming an alignment layer was applied onto a surface of the above-described support 1A, on which the easy adhesion layer was not formed, with a wire bar coater. Thereafter, the applied coating liquid 1 for forming an alignment layer was dried at 100° C. for 120 seconds to produce an alignment layer 1 having a layer thickness of 0.5 μm.

<Formation of Cholesteric Liquid Crystal Layer 1>

With regard to the above-described alignment layer 1 produced, the alignment layer 1 was subjected to a rubbing treatment (rayon cloth, pressure: 0.1 kgf (0.98 N), rotation speed: 1,000 rpm (revolutions per minute), transportation speed: 10 μm/minute, number of times: 1 round trip) in a direction rotated counterclockwise by 31.5° with respect to a short side direction. Components included in the coating liquid 1 for forming a cholesteric liquid crystal layer, which are shown below, were stirred and dissolved in a container kept at a temperature of 25° C. to prepare a coating liquid 1 for forming a cholesteric liquid crystal layer (liquid crystal composition 1).

[Composition of Coating Liquid 1 for Forming Cholesteric Liquid Crystal Layer]

Methyl ethyl ketone: 150.6 parts by mass
Liquid crystal compound 1 (rod-like liquid crystal compound): 92 parts by mass
Photopolymerization initiator A (IRGACURE 907, manufactured by BASF): 0.50 parts by mass
Chiral agent A: 4.00 parts by mass
Chiral agent B: 4.00 parts by mass
Surfactant F1 described below: 0.027 parts by mass Liquid crystal compound 1 (monofunctional): rod-like liquid crystal compound shown below; in a case of a radical polymerization type, the liquid crystal compound 1 is defined as monofunctional because, although the liquid crystal compound 1 has an oxetanyl group (a cationically polymerizable functional group), the liquid crystal compound 1 has only one acryloxy group (radically polymerizable group); the same applies to the cationic polymerization type.

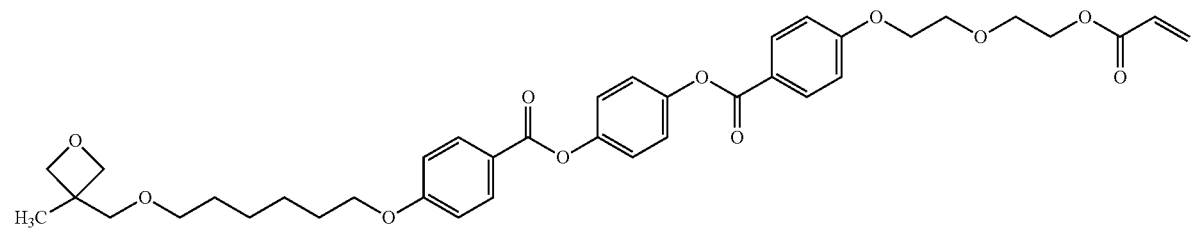 [SMILES: C=CC(=O)OCCOCCOc1ccc(C(=O)Oc2ccc(OC(=O)c3ccc(OCCCCCCOCC4(C)COC4)cc3)cc2)cc1]

40

Chiral agent A (bifunctional): compound shown below

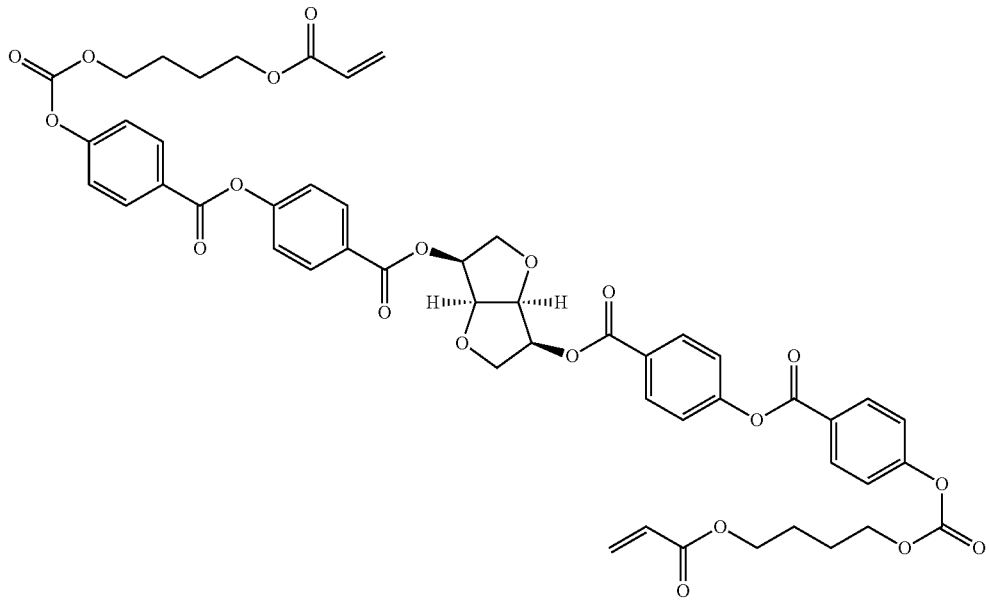 [SMILES: C=CC(=O)OCCCCOC(=O)Oc1ccc(C(=O)Oc2ccc(C(=O)O[C@H]3CO[C@@H]4[C@H]3OC[C@@H]4OC(=O)c3ccc(OC(=O)c4ccc(OC(=O)OCCCCOC(=O)C=C)cc4)cc3)cc2)cc1]

Chiral agent B (non-functional): compound shown below; in the following compound, Bu represents an n-butyl group.

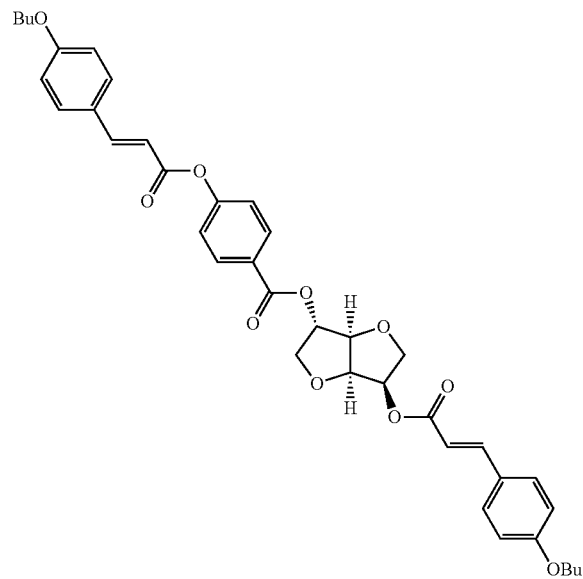

Surfactant F1: compound shown below

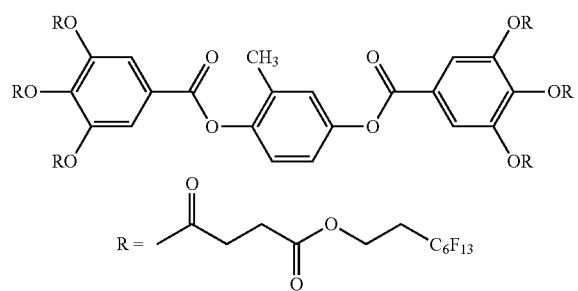

The coating liquid 1 for forming a cholesteric liquid crystal layer prepared above was applied onto the rubbing-treated surface of the alignment layer 1 with a wire bar coater, and dried at 85° C. for 120 seconds. The surface of the cholesteric liquid crystal layer of the formed laminate was entirely exposed with an exposure amount of 70 μmJ/cm² (i rays) to produce a cholesteric liquid crystal layer 1 having a layer thickness of 3.0 μm.

The coating liquid 1 for forming a cholesteric liquid crystal layer prepared above was applied onto the rubbing-treated surface of the alignment layer 1 with a wire bar coater, and dried at 85° C. for 120 seconds. The surface of the cholesteric liquid crystal layer of the formed laminate was entirely exposed with an exposure amount of 70 μmJ/cm² (i rays) to form a cholesteric liquid crystal layer 1 having a layer thickness of 3.0 μm, thereby forming a laminate 1-1. The laminate 1-1 includes the support 1A, the alignment layer 1, and the cholesteric liquid crystal layer 1 in this order.

<Production of Laminate 1-2>

An acrylic pressure sensitive adhesive (SK-Dyne SG-50Y, manufactured by Soken Chemical & Engineering Co., Ltd.) was applied onto a surface of COSMOSHINE (registered trademark) A4100 (that is, the support 1B) prepared separately, on which the easy adhesion layer had been formed, with a comma coater, and dried at 120° C. for 2 μminutes to form a resin layer 1 (adhesive layer) having a layer thickness of 20 μm, thereby forming a laminate 1-2. The laminate 1-2 includes the support 1B and the resin layer 1.

<Production of Laminate 1-3>

The laminate 1-1 and the laminate 1-2 were bonded together by a laminator such that the resin layer 1 and the above-described cholesteric liquid crystal layer 1 were in contact with each other. By peeling off the PET film (that is, the support 1A) on the side of the laminate 1-1, a laminate 1-3 in which support 1B/resin layer 1/cholesteric liquid crystal layer 1/alignment layer 1 were laminated in this order was obtained.

<Production of Laminate 1-4>

Figure 7:
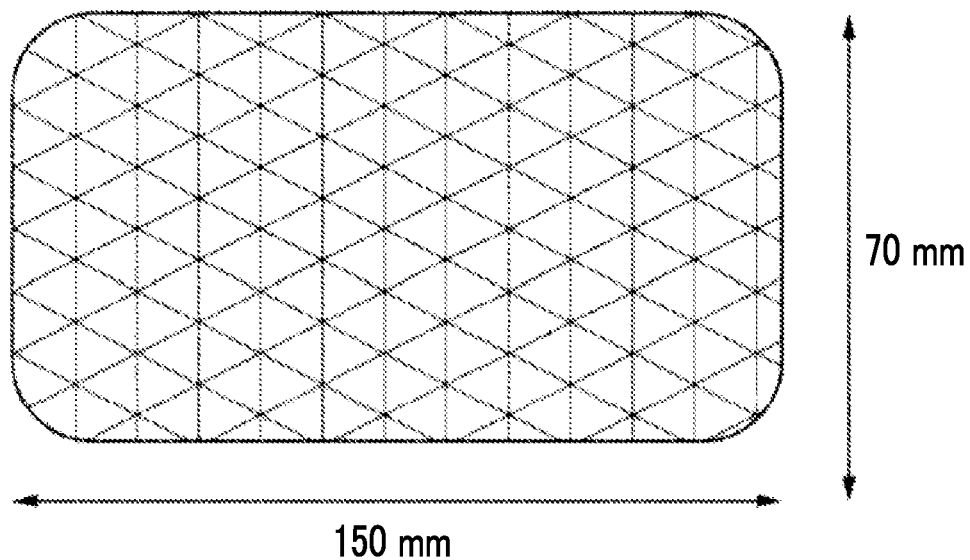
FIG. 7 is a schematic plan view showing an example of a transparent body having an uneven structure according to the present disclosure.
Figure 8:
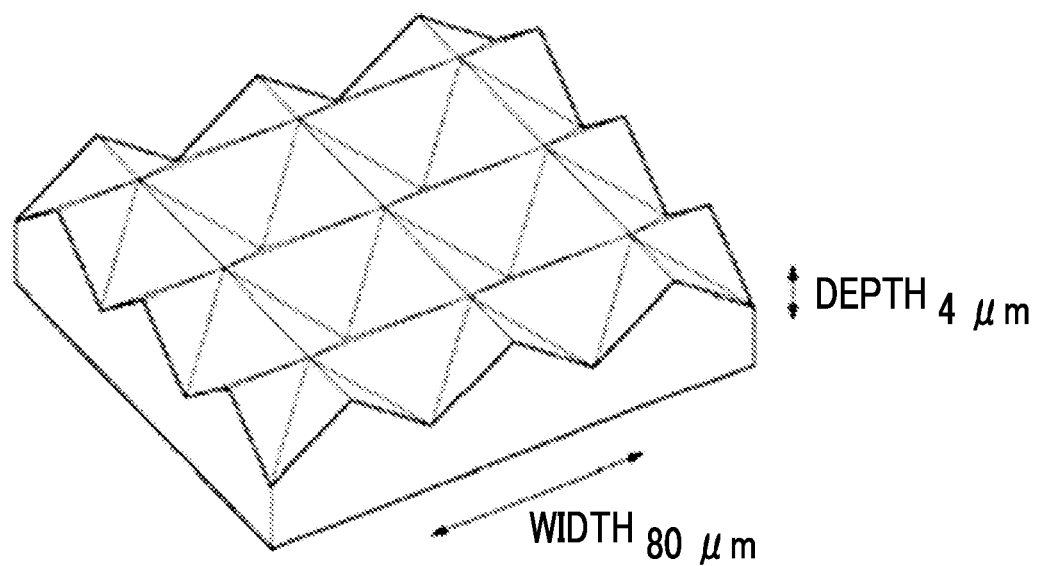
FIG. 8 is a schematic perspective view of the transparent body having the uneven structure according to the present disclosure.

The surface of the alignment layer 1 of the laminate 1-3 was subjected to a corona treatment using a table corona treatment device (TEC-8XA, manufactured by KASUGA DENKI, INC., setting output: 70 W, operation speed: 1 m/min, number of times: 5 reciprocations), and using a transparent body having an uneven pattern as shown in FIG. 7 (thickness: 50 μm, width: 140 μmm, length: 70 μmm) as a mold, the surface of the alignment layer 1 of the laminate 1-3 was brought into contact with a convex surface of the transparent body, and subjected to a compressed air molding (TOM molding) to for a laminate 1-4. A TOM molding machine NGF-0510-R (manufactured by Fu-se Vacuum Forming) was used for the compressed air molding, and the molding temperature was set to 120° C. and the stretching ratio was set to 30% at the highest portion. The pressure in the compressed air molding was 0.3 MPa. In a case where a diffuse reflectance of the cholesteric liquid crystal layer 1 laminated in the uneven pattern was measured through the alignment layer 1, it was 75%.

The diffuse reflectance measured through the alignment layer 1 was the same as the diffuse reflectance measured without the alignment layer 1.

<Production of Molded Article 1>

By forming an indium layer (50 nm) on the support 1B of the laminate 1-4 using a vacuum sputtering device (VEP-1000, manufactured by ULVAC, Inc.), a mirror layer 1 was laminated thereon to form a molded article 1 (that is, a decorative molded article). The molded article 1 included the mirror layer 1, the support 1B, the resin layer 1, the cholesteric liquid crystal layer 1, and the alignment layer 1 in this order. In a case where diffuse reflectivity of the mirror layer 1 was evaluated by separately forming an indium sputter layer was formed on COSMOSHINE (registered trademark) A4100 (PET, thickness: 50 μm, film having an easy adhesion layer on one side, manufactured by Toyobo Co., Ltd., A4 size) under the same conditions as described above, the diffuse reflectivity was 4%.

Example 2

<Formation of Cholesteric Liquid Crystal Layer 2>

Instead of forming the mirror layer 1 on the support 1B of the laminate 1-4 of Example 1, a coating liquid for forming the alignment layer 1 was applied thereto with a wire bar coater. Thereafter, the applied coating liquid 1 for forming an alignment layer was dried at 100° C. for 120 seconds to produce an alignment layer 2 having a layer thickness of 0.5 μm. With regard to the above-described alignment layer 2 produced, the alignment layer 2 was subjected to a rubbing treatment (rayon cloth, pressure: 0.1 kgf (0.98 N), rotation speed: 1,000 rpm (revolutions per minute), transportation speed: 10 μm/minute, number of times: 1 round trip) in a direction rotated counterclockwise by 31.5° with respect to a short side direction. Components included in the coating liquid 2 for forming a cholesteric liquid crystal layer, which are shown below, were stirred and dissolved in a container kept at a temperature of 25° C. to prepare a coating liquid 2 for forming a cholesteric liquid crystal layer (liquid crystal composition 2).

[Composition of Coating Liquid 2 for Forming Cholesteric Liquid Crystal Layer]

Methyl ethyl ketone: 150.6 parts by mass
Liquid crystal compound 1 (rod-like liquid crystal compound): 92 parts by mass
Photopolymerization initiator A (IRGACURE 907, manufactured by BASF): 0.50 parts by mass
Chiral agent A: 2.50 parts by mass
Chiral agent B: 2.50 parts by mass
Surfactant F1: 0.027 parts by mass The coating liquid 2 for forming a cholesteric liquid crystal layer prepared above was applied onto the rubbing-treated surface of the alignment layer 2 with a wire bar coater, and dried at 85° C. for 120 seconds. The surface of the cholesteric liquid crystal layer of the formed laminate was entirely exposed with an exposure amount of 70 μmJ/cm$^2$ (i rays) to form a cholesteric liquid crystal layer 2 having a layer thickness of 8.0 μm. Diffuse reflectance of the formed cholesteric liquid crystal layer 2 was measured.

Furthermore, nax REAL 642 (mirror black, manufactured by NIPPONPAINT Co., Ltd.) was applied onto the cholesteric liquid crystal layer 2 using a wire bar coater, and dried at 100° C. for 120 seconds to form a colored layer 2 having a layer thickness of 8.0 μm, thereby producing a decorative panel 2.

Diffuse reflectance of the cholesteric liquid crystal layer 1 was measured through the alignment layer 1. The diffuse reflectance measured through the alignment layer 1 was the same as the diffuse reflectance measured without the alignment layer 1.

Example 3

A laminate 3-1 was formed in the same manner as the laminate 1-1 of Example 1, except that, after forming the alignment layer 1 of Example 1, without rubbing, the coating liquid 1 for forming a cholesteric liquid crystal layer was applied onto the alignment layer 1 and dried to form a cholesteric liquid crystal layer 3. The laminate 3-1 included the support 1A, the alignment layer 1, and the cholesteric liquid crystal layer 3 in this order. Diffuse reflectance of the formed cholesteric liquid crystal layer 3 was measured.

By forming an indium layer (50 nm) on a surface of the support 1A of the laminate 3-1, opposite to the cholesteric liquid crystal layer 3, using a vacuum sputtering device (VEP-1000, manufactured by ULVAC, Inc.), a mirror layer 3 was laminated thereon to form a molded article 3 (that is, a decorative molded article). The molded article 3 included the mirror layer 3, the support 1A, the alignment layer 1, and the cholesteric liquid crystal layer 1 in this order. The diffuse reflectance of the mirror layer 3 was 4%, same as that of the mirror layer 1 evaluated in Example 1.

Example 4

A laminate 4-4 was formed in the same manner as the laminate 1-4 of Example 1, except that the coating liquid 2 for forming a cholesteric liquid crystal layer was used instead of the coating liquid 1 for forming a cholesteric liquid crystal layer.

An acrylic pressure sensitive adhesive (SK-Dyne SG-50Y, manufactured by Soken Chemical & Engineering Co., Ltd.) was applied onto a surface of the support 1B of the laminate 4-4, on which an easy adhesion layer had been formed, using a comma coater, and dried at 120° C. for 2 μminutes to form a pressure-sensitive adhesive layer 4 having a layer thickness of 20 m. Furthermore, by bonding the surface of the molded article 1 of Example 1, opposite to the mirror layer 1, (that is, the surface of the alignment layer in the molded article 1 of Example 1) and the pressure-sensitive adhesive layer 4 together with a laminator, a molded article 4 (that is, a decorative molded article) was produced.

The diffuse reflectance of the mirror layer 1 was 4%, same as that of the mirror layer 1 evaluated in Example 1.

Diffuse reflectances of the cholesteric liquid crystal layer 1 and the cholesteric liquid crystal layer 2 were measured before bonding the molded article 1 and the laminate 4-4 together. The diffuse reflectance of the cholesteric liquid crystal layer 1 was measured through the alignment layer 1 of the molded article 1, and the diffuse reflectance of the cholesteric liquid crystal layer 2 was measured through the alignment layer 1 of the laminate 4-4. The diffuse reflectance measured through the alignment layer 1 was the same as the diffuse reflectance measured without the alignment layer 1.

Example 5

Figure 9:
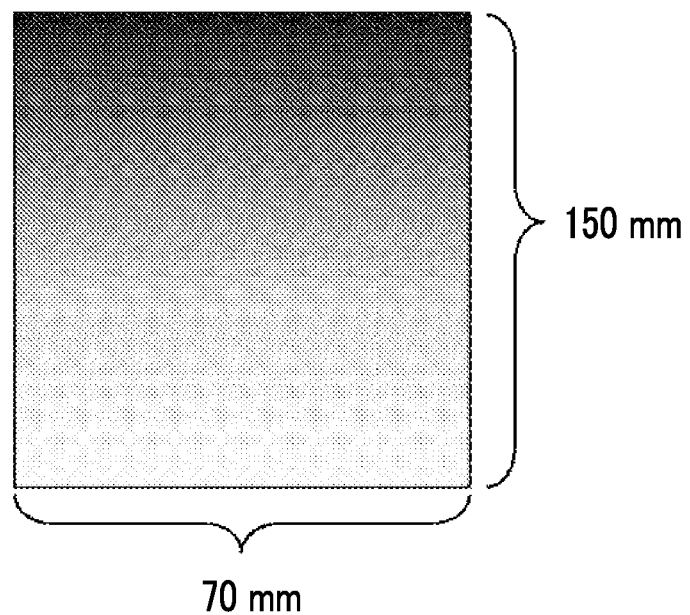
FIG. 9 is a schematic view showing a black image pattern which is an example of a printing layer according to the present disclosure.

A laminate 5-1 was formed in the same manner as the laminate 1-1 of Example 1. In addition, a laminate 5-2 was formed in the same manner as the laminate 1-1 of Example 1, except that the coating liquid 2 for forming a cholesteric liquid crystal layer was used. The black image pattern (printing layer) shown in FIG. 9 was printed on a surface of the laminate 5-1, on which an easy adhesion layer had been formed, with Acuity 1600 (manufactured by FUJIFILM Corporation, UV inkjet printer, resolution: 320 dpi) to produce a laminate 5-3. Furthermore, an acrylic pressure sensitive adhesive (SK-Dyne SG-50Y, manufactured by Soken Chemical & Engineering Co., Ltd.) was applied onto the printed surface of the laminate 5-3 using a comma coater, and dried at 120° C. for 2 μminutes to form a pressure-sensitive adhesive layer 5 having a layer thickness of 20 μm. Furthermore, by bonding the surface of the laminate 5-2, on which the cholesteric liquid crystal layer 2 was formed, and the pressure-sensitive adhesive layer 5 together with a laminator, a laminate 5-4 was formed. Furthermore, nax REAL 642 (mirror black, manufactured by NIPPONPAINT Co., Ltd.) was applied onto the surface of the laminate 5-4 on the laminate 5-2 portion opposite to the side having the alignment layer 1 of the support 1A using a wire bar coater, and dried at 100° C. for 120 seconds to form a colored layer 5 having a layer thickness of 8.0 μm, thereby producing a decorative panel 5.

Diffuse reflectances of the cholesteric liquid crystal layer 1 and the cholesteric liquid crystal layer 2 were measured before bonding the laminate 5-2 and the laminate 5-3 together.

Example 6

By forming an indium layer (50 nm) on the printed surface (printing layer) of the laminate 5-3 of Example 5 using a vacuum sputtering device (VEP-1000, manufactured by ULVAC, Inc.), a mirror layer 5 was laminated thereon to form a decorative panel 6. The diffuse reflectance of the mirror layer 5 was 4%, same as that of the mirror layer 1 evaluated in Example 1.

Comparative Example 1

By forming an indium layer (50 nm) on the surface of COSMOSHINE (registered trademark) A4100 (PET, thickness: 50 µm, film having an easy adhesion layer on one side, manufactured by Toyobo Co., Ltd., A4 size), on which the easy adhesion layer had been formed, using a vacuum sputtering device (VEP-1000, manufactured by ULVAC, Inc.), a mirror layer 1-B was laminated thereon to form a molded article 1-B.

The diffuse reflectance of the mirror layer 1-B was 4%, same as that of the mirror layer 1 evaluated in Example 1.

Comparative Example 2

By forming an indium layer (50 nm) on the surface of the laminate 5-1 of Example 5, on which the easy adhesion layer of the support 1A was formed, using a vacuum sputtering device (VEP-1000, manufactured by ULVAC, Inc.), a mirror layer 2-B was laminated thereon to form a molded article 2-B.

The diffuse reflectance of the mirror layer 2-B was 4%, same as that of the mirror layer 1 evaluated in Example 1.

<Performance Evaluation>

—Diffuse Reflectance—

Using a spectrophotometer V-670 µmanufactured by JASCO Corporation, an absolute reflectance (Rs) and an integral reflectance (Rd) were measured in a wavelength range of 380 nm to 1,100 nm from a direction perpendicular to the base material, and a value of diffuse reflectance (Rd–Rs)/Rd of each optical reflective layer was calculated. The diffuse reflectance is a value at a wavelength which gives the highest reflectance among the maximal values of the reflection spectrum.

—Lustrousness—

Using a spectrophotometer V-670 µmanufactured by JASCO Corporation, reflectances of the molded article 1, the decorative panels 2, 5, and 6, the molded articles 3 and 4, and the laminates 1-B and 2-B (hereinafter, may be referred to as a "molded article and the like") were measured in a wavelength range of 380 nm to 1,100 nm from a direction perpendicular to an upper design of the panel. The highest value in the maximal values of the reflection spectrum was defined as the reflectance.

The "upper design of the panel" refers the alignment layer 1 for the molded article 1 and the decorative panel 2, the cholesteric liquid crystal layer 3 for the molded article 3, the alignment layer 1 (on the cholesteric liquid crystal layer 2) for the molded article 4, the cholesteric liquid crystal layer 1 for the decorative panels 5 and 6, the film for the laminate 1-B, and the cholesteric liquid crystal layer 1 for the laminate 2-B.

With respect to the molded article and the like, a surface (140 µmm×70 µmm) of the upper design of the panel in a plan view was divided into regions (98 portions) having a size of 10 µmm, and the reflectance of a central portion of each region was measured. The evaluation standard is as follows. Practical levels were A, B, and C, and it was determined that the lustrousness was high. As an evaluation result, C is preferable, B is more preferable, and A is particularly preferable.

<<Evaluation Standard>>

A: there were regions in-plane, in which the reflectances differed by 40% or more.

B: there were regions in-plane, in which the reflectances differed by 30% or more and less than 40%, but there was no region in-plane, in which the reflectances differed by 40% or more.

C: there were regions in-plane, in which the reflectances differed by 15% or more and less than 30%, but there was no region in-plane, in which the reflectances differed by 30% or more.

D: there was no region in-plane, in which the reflectances differed by 15% or more.

—Chroma Saturation—

With respect to the molded article and the like, using a spectrophotometer V-670 manufactured by JASCO Corporation, a reflection spectrum was measured in a wavelength range of 380 nm to 780 nm from a direction perpendicular to the upper design of the panel. Using a color diagnosis software (color evaluation (color diagnosis) program) equipped to the device, a chroma saturation $C^*ab$ was calculated.

In the evaluation of lustrousness, the reflectance of a central portion of each of the above-described 10 µmm-sized regions (98 portions) was measured. The evaluation standard is as follows. Practical levels were A, B, and C, and it was determined that the chroma saturation was high.

<<Evaluation Standard>>

A: there was a region in-plane, in which the chroma saturation was 40 or more.

B: there was a region in-plane, in which the chroma saturation was 25 or more and less than 40.

C: there was a region in-plane, in which the chroma saturation differed by 10 or more and less than 25.

D: in-plane chroma saturation was all less than 10.

—Dependence of Tint on Viewing Angle (Evaluation as to Whether Larger Change in Tint can be Obtained Depending on Viewing Angle)—

With respect to the molded article and the like, in a case where a direction perpendicular to a surface direction of the upper design of the panel was set to 0°, the change in tint in a case of viewing from the angles of 0° and 45° (for example, yellow in the 0° direction, blue in the 45° direction, and the like) was evaluated by the following standard. Practical levels were A, B, and C, and it was determined that the change in tint was rich depending on the viewing direction. As an evaluation result, C is preferable, B is more preferable, and A is particularly preferable.

<<Evaluation Standard>>

A: there was a large change in tint between a case of viewing from the 0° direction and a case of viewing from the 45° direction.

B: there was a change in tint between a case of viewing from the 0° direction and a case of viewing from the 45° direction.

C: there was a slight change in tint between a case of viewing from the 0° direction and a case of viewing from the 45° direction.

D: there was almost no change in tint between a case of viewing from the 0° direction and a case of viewing from the 45° direction.

The evaluation results of Examples 1 to 6 and Comparative Examples 1 and 2 are shown in Tables 1 and 2. In Tables 1 and 2, the "Reflective layer" means the "Optical reflective layer".

TABLE 1

|  |  | Example 1 | Example 2 | Example 3 | Example 4 | Comparative Example 1 |
|---|---|---|---|---|---|---|
| Configuration of reflective layer | Reflective layer (1) | Cholesteric liquid crystal layer 1 | Cholesteric liquid crystal layer 1 | Cholesteric liquid crystal layer 3 | Cholesteric liquid crystal layer 1 | In sputter layer |
|  | Reflective layer (2) | In sputter layer | Cholesteric liquid crystal layer 2 | In sputter layer | Cholesteric liquid crystal layer 2 | — |
|  | Reflective layer (3) | — | — | — | In sputter layer | — |
| Diffuse reflectance of each reflective layer | Reflective layer (1) | 75% | 75% | 55% | 75% | 4% |
|  | Reflective layer (2) | 4% | 12% | 4% | 55% | — |
|  | Reflective layer (3) | — | — | — | 4% | — |
| Evaluation | Lustrousness | A | A | A | A | A |
|  | Chroma saturation | B | A | B | A | D |
|  | Dependence of tint on viewing angle | A | A | A | B | D |

TABLE 2

|  |  | Example 5 | Example 6 | Comparative Example 2 |
|---|---|---|---|---|
| Configuration of reflective layer | Reflective layer (1) | Cholesteric liquid crystal layer 1 | Cholesteric liquid crystal layer 1 | Cholesteric liquid crystal layer 1 |
|  | Reflective layer (2) | Cholesteric liquid crystal layer 2 | In sputter layer | In sputter layer |
| Printing layer |  | Black image pattern | Black image pattern | None |
| Diffuse reflectance of each reflective layer | Reflective layer (1) | 4% | 4% | 4% |
|  | Reflective layer (2) | 4% | 4% | 4% |
| Evaluation | Lustrousness | A | A | A |
|  | Chroma saturation | A | B | D |
|  | Dependence of tint on viewing angle | A | A | C |

The disclosure of JP2020-156576 filed on Sep. 17, 2020 is incorporated in the present specification by reference. All documents, patent applications, and technical standards described in the present specification are herein incorporated by reference to the same extent that each individual document, patent application, or technical standard was specifically and individually indicated to be incorporated by reference.

What is claimed is:

1. A decorative film comprising:
   a base material; and
   an optical reflective layer coloring by optical interference or structural color,
   wherein at least two or more layers of the optical reflective layer are laminated, and
   diffuse reflectivities of the respective optical reflective layers differ by 20% or more.

2. The decorative film according to claim 1,
   wherein at least one layer of the optical reflective layers is a layer including a cholesteric liquid crystal compound.

3. The decorative film according to claim 2,
   wherein the layer including a cholesteric liquid crystal compound is a layer formed by curing a liquid crystal composition including a cholesteric liquid crystal compound.

4. The decorative film according to claim 3,
   wherein the liquid crystal composition includes 25% by mass or more of a cholesteric liquid crystal compound having one ethylenically unsaturated group or one cyclic ether group.

5. The decorative film according to claim 2, further comprising an alignment layer which is in contact with the layer including a cholesteric liquid crystal compound.

6. The decorative film according to claim 1,
   wherein the optical reflective layers include an optical reflective layer having a maximal reflection wavelength in a wavelength range of 380 nm to 1,500 nm.

7. The decorative film according to claim 1,
   wherein the optical reflective layers include an optical reflective layer having a maximal reflection wavelength in a wavelength range of 420 nm to 780 nm.

8. The decorative film according to claim 1,
   wherein the optical reflective layers have a thickness of 0.5 μm to 10.0 μm per layer.

9. The decorative film according to claim 1, further comprising a colored layer.

10. The decorative film according to claim 1, further comprising a resin layer between the base material and one of the optical reflective layers.

11. The decorative film according to claim 1,
    wherein at least one of the optical reflective layers is a layer including a cholesteric liquid crystal compound, an optical multilayer film, or a layer including a chromic material.

12. A decorative molded article comprising:
    the decorative film according to claim 1.

13. A decorative panel comprising:
    the decorative film according to claim 1.

14. An electronic device comprising:
    the decorative panel according to claim 13.

15. The decorative film according to claim 1, wherein at least two layers among the at least two or more layers of the optical reflective layer are layers each comprising a cholesteric liquid crystal compound, and the layers each comprising the cholesteric liquid crystal compound are disposed on each surface of the base material.

16. The decorative film according to claim 1, wherein The decorative film according to claim 1, wherein at least one layer of the at least two or more layers of the optical reflective layer is a cholesteric liquid crystal layer, and at least one of the at least two or more layers of the optical reflective layer is an In thin film.

* * * * *